(12) United States Patent
Quan et al.

(10) Patent No.: US 9,591,298 B2
(45) Date of Patent: Mar. 7, 2017

(54) SYSTEM AND METHOD FOR TWO-DIMENSIONAL (2D) AND THREE-DIMENSIONAL (3D) DISPLAY

(71) Applicant: SuperD Co. Ltd., Shenzhen (CN)

(72) Inventors: Hongwei Quan, Shenzhen (CN); Fuzhong Guo, Shenzhen (CN); Xiaoda Gong, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 51 days.

(21) Appl. No.: 14/490,895

(22) Filed: Sep. 19, 2014

(65) Prior Publication Data

US 2015/0091886 A1  Apr. 2, 2015

(30) Foreign Application Priority Data

Sep. 30, 2013 (CN) .......... 2013 1 0461425
Sep. 30, 2013 (CN) .......... 2013 1 0465568

(51) Int. Cl.
 *H04N 13/04* (2006.01)
 *G02B 27/22* (2006.01)
 *G02F 1/1343* (2006.01)

(52) U.S. Cl.
 CPC ..... *H04N 13/0497* (2013.01); *G02B 27/2214* (2013.01); *G02F 1/134363* (2013.01); *H04N 13/0406* (2013.01); *H04N 13/0454* (2013.01); *G02F 2001/134381* (2013.01)

(58) Field of Classification Search
 None
 See application file for complete search history.

(56) References Cited

U.S. PATENT DOCUMENTS

2005/0105033 A1* 5/2005 Itou .............. G02F 1/134363
349/141
2009/0122210 A1* 5/2009 Im .............. G02B 27/2228
349/15

(Continued)

FOREIGN PATENT DOCUMENTS

CN  201716500 U  1/2011
CN  102096229 A  6/2011

(Continued)

*Primary Examiner* — Patrick Edouard
*Assistant Examiner* — Matthew Yeung
(74) *Attorney, Agent, or Firm* — Anova Law Group, PLLC

(57) ABSTRACT

A 2D/3D display system is provided. The system includes a first substrate, a second substrate arranged facing the first substrate with a distance from the first substrate, a liquid crystal layer including liquid crystal molecules and configured to provide a display area, a first electrode section and a second electrode section arranged on a first side of the liquid crystal layer, a third electrode section arranged on a second side of the liquid crystal layer, and voltage output modules. The voltage output modules are configured to receive image display adjustment signals, where the image display adjustment signals includes at least one of 2D display area position information and 3D display area position information. The voltage output modules are also configured to provide one or more driving voltages for the first electrode section, the second electrode section and the third electrode section based on the received image display adjustment signals.

7 Claims, 13 Drawing Sheets

(56) References Cited

U.S. PATENT DOCUMENTS

| | | | |
|---|---|---|---|
| 2011/0285953 A1* | 11/2011 | Liu | G02F 1/292 |
| | | | 349/141 |
| 2013/0100364 A1* | 4/2013 | Hsiao | G02F 1/29 |
| | | | 349/15 |
| 2013/0201415 A1 | 8/2013 | Chang et al. | |
| 2013/0208196 A1* | 8/2013 | Kim | G02F 1/134309 |
| | | | 349/15 |
| 2013/0257828 A1* | 10/2013 | Azuma | G02F 1/29 |
| | | | 345/204 |

FOREIGN PATENT DOCUMENTS

| | | |
|---|---|---|
| CN | 202306073 U | 7/2012 |
| CN | 102621763 A | 8/2012 |
| CN | 102768448 A | 11/2012 |
| JP | 2012098689 A | 5/2012 |

* cited by examiner

SYSTEM AND METHOD FOR TWO-DIMENSIONAL (2D) AND THREE-DIMENSIONAL (3D) DISPLAY

CROSS-REFERENCES TO RELATED APPLICATIONS

This application claims the priority of Chinese patent application number 201310465568.6, filed on Sep. 30, 2013, Chinese patent application number 201310461425.8, filed on Sep. 30, 2013, the entire contents of all of which are incorporated herein by reference.

FIELD OF THE INVENTION

The present invention generally relates to the fields of liquid crystal technologies and, more particularly, to systems and methods for displaying in and switching between a two-dimensional (2D) display mode and a three-dimensional (3D) display mode.

BACKGROUND

Stereoscopic vision is produced because the left eye and the right eye of a viewer receive images from different angles, and layering and depth perception of objects are perceived after brain synthesizes the images. With the development of stereoscopic display technologies, a variety of three-dimensional display modes are currently appear such that the viewer can obtain stereoscopic vision.

Current three-dimensional (3D) display devices are generally divided into passive stereoscopic display devices and autostereoscopic display devices. For example, when a viewer uses a passive stereoscopic display device, the viewer needs to wear an auxiliary device, such as a pair of glasses or a headgear, to perceive a stereoscopic display effect. In autostereoscopic display (also known as naked-eye 3D display), the viewer can see 3D images directly from the display device without using any auxiliary device.

The main principle of autostereoscopic display device is to place a grating in front of a display panel, i.e. a slit grating. For example, at least two parallax images displayed on a display panel are directed separately to the left eye and the right eye in a viewing area of a viewer through the slit grating, and then fused into a stereoscopic image through the optic center of the viewer. The grating may be a slit grating or a lenticular lens grating.

Recently, the autostereoscopic display devices can be implemented by liquid crystal lenses. Based on the birefringence of the liquid crystal, voltages are used to control the distribution of the liquid crystal molecules to produce a lens effect for incident lights. The biggest advantage of this kind of three-dimensional display device is that the refractive index and the focal length of the lens are adjustable. However, current technologies are still using the three-dimensional display device formed based on conventional lenticular lens grating, where the fixed lenticular lens grating requires a special switching device to achieve 2D/3D coexistence. The term 2D/3D coexistence refers to, on a same screen, 2D content is displayed in a part of the display area, while 3D content is displayed in another part of the display area. The use of the lenticular lens grating undoubtedly increases the cost, and too many drive chips and other hardware circuits also bring much lower yield. Another kind of adjustable lenticular lens grating implements 2D/3D coexistence by filling ordinary liquid crystal and through electrode control. However, this kind of lenticular lens grating uses two levels of electrodes, so the display effect of 2D/3D coexistence is still poor.

The disclosed systems and methods are directed to solve one or more problems set forth above and other problems.

BRIEF SUMMARY OF THE DISCLOSURE

One aspect of the present disclosure includes a 2D/3D display system. The system includes a first substrate, a second substrate arranged facing the first substrate with a distance from the first substrate, a liquid crystal layer including liquid crystal molecules and configured to provide a display area, a first electrode section and a second electrode section arranged on a first side of the liquid crystal layer, a third electrode section arranged on a second side of the liquid crystal layer, and voltage output modules. The voltage output modules are configured to receive image display adjustment signals, where the image display adjustment signals includes at least one of 2D display area position information and 3D display area position information. The voltage output modules are also configured to provide one or more driving voltages for the first electrode section, the second electrode section and the third electrode section based on the received image display adjustment signals. When the liquid crystal molecules in a 3D display area corresponding to the 3D display area position information form multiple lens units with refractive indexes of the liquid crystal molecules distributed in a gradient, a 3D image is displayed. When the refractive indexes of the liquid crystal molecules in the 2D display area corresponding to the 2D display area position information are not distributed in a gradient, a 2D image is displayed.

Another aspect of the present disclosure includes a driving method for 2D/3D display applied to a 2D/3D display device including a liquid crystal layer, a first electrode section and a second electrode section arranged on a first side of the liquid crystal layer, a third electrode section arranged on a second side of the liquid crystal layer. The driving method includes voltage output modules receiving image display adjustment signals, where the image display adjustment signals includes at least one of 2D display area position information and 3D display area position information. The driving method also includes the voltage output modules providing one or more driving voltages for the first electrode section, the second electrode section and the third electrode section based on the received image display adjustment signals. When the liquid crystal molecules in a 3D display area corresponding to the 3D display area position information form multiple lens units with refractive indexes of the liquid crystal molecules distributed in a gradient, the 3D image is displayed. When the refractive indexes of the liquid crystal molecules in the 2D display area corresponding to the 2D display area position information are not distributed in a gradient, the 2D image is displayed.

Another aspect of the present disclosure includes a liquid crystal lens. The liquid crystal lens includes a first substrate, a second substrate arranged facing the first substrate with a distance from the first substrate, and a liquid crystal layer including liquid crystal molecules having birefringence and anisotropy, placed between the first substrate and the second substrate. The liquid crystal lens also includes a first electrode group, including a plurality of first electrodes separated with a certain distance, arranged on a surface of the first substrate, a second electrode group, including a plurality of second electrodes separated with a certain distance, arranged on the first electrode group, and an insulating layer disposed between the first electrode group and the second electrode group, where the first electrode group, the second electrode group, and the insulating layer face the second substrate. Further, the liquid crystal lens includes a third electrode group, including a plurality of third electrodes separated with a certain distance, arranged on the surface of the second substrate, facing the first substrate and along a first direction.

Other aspects of the present disclosure can be understood by those skilled in the art in light of the description, the claims, and the drawings of the present disclosure.

BRIEF DESCRIPTION OF THE DRAWINGS

In order to describe the technical solution of the embodiments of the present invention more clearly, drawings used in the description of the embodiments are introduced below. The drawings described below are merely exemplary embodiments of the present invention. For those skilled in the art, on the premise of no inventive effort being involved, other drawings may also be obtained according to these drawings and the descriptions included herein.

DETAILED DESCRIPTION

In the following description, for purposes of illustration, many specific details are illustrated in order to provide a full understanding of one or more embodiments. However, obviously, those embodiments can also be implemented in the case of these specific details changed, replaced, or alternated. The followings, together with accompanying drawings, describe in detail certain embodiments of the present invention.

Figure 1:
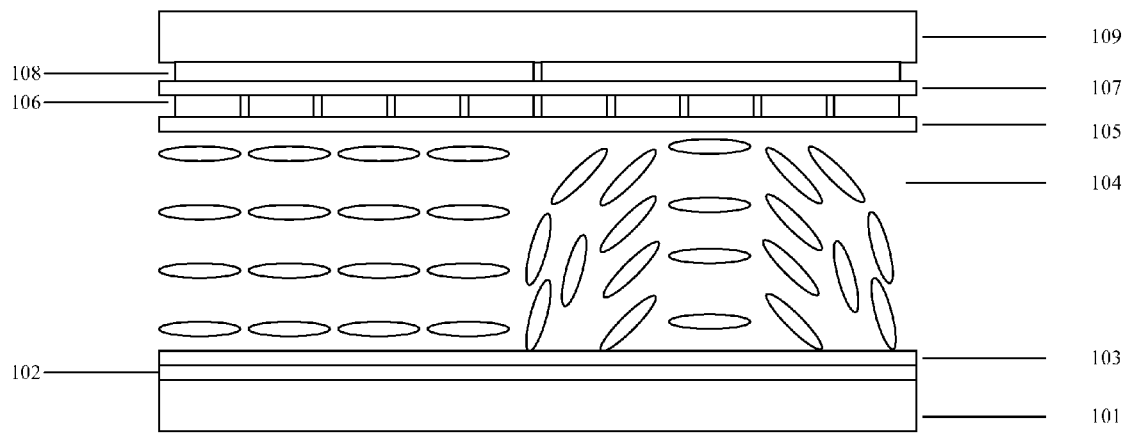
FIG. 1 illustrates a schematic diagram of an exemplary section of a liquid crystal lens consistent with the disclosed embodiments.

FIG. 1 illustrates a schematic diagram of an exemplary section of a liquid crystal lens consistent with the disclosed embodiments. For illustration purposes, only part of the sectional drawing is shown in FIG. 1. As shown in FIG. 1, the liquid crystal lens may include a first substrate 109, a second substrate 101, a plurality of first electrodes 108, a plurality of second electrodes 106, a plurality of third electrodes 102, a first alignment layer 105, a second alignment layer 103, a liquid crystal layer 104, and an insulating layer 107. Other components may also be included.

The first substrate 109 and the second substrate 101 are arranged to face each other, and a certain distance exists between the first substrate 109 and the second substrate 101.

The liquid crystal layer 104 is placed between the first substrate 109 and the second substrate 101. The liquid crystal layer 104 includes liquid crystal molecules having birefringence and anisotropy.

A first electrode group including a plurality of first electrodes 108 may be arranged on the surface of the first substrate 109, and a second electrode group including a plurality of second electrodes 106 may be arranged on the first electrode group. The insulating layer 107 is disposed between the first electrode group and the second electrode group, i.e., between the first electrodes 108 and the second electrodes 106. The first electrode group, the second electrode group, and the insulating layer 107 face the second substrate 101.

A third electrode group including a plurality of third electrodes 102 may be arranged on the surface of the second substrate 101, facing the first substrate 109 and along a first direction. A certain distance exists between every two adjacent third electrodes.

The first electrodes 108 and the second electrodes 106 extend along a second direction different from the first direction. A certain distance exists between every two adjacent first electrodes 108, and a certain distances exist between every two adjacent second electrodes 106. Each first electrode corresponds to a plurality of second electrodes in the second direction. Optionally, each first electrode corresponds to an odd number of second electrodes in the second direction.

In one embodiment, the second electrode group includes the second electrodes 106, the insulating layer 107 and the first electrodes 108 in turn on the surface of the first substrate 109, facing the second substrate 101 and in the direction pointing to the second substrate 101.

In another embodiment, the second electrode group includes the first electrodes 108, the insulating layer 107 and the second electrodes 106 in turn on the surface of the first substrate 109, facing the second substrate 101 and in the direction pointing to the second substrate 101.

At least one of the first electrodes 108, the second electrodes 106 and the third electrodes 102 is a strip electrode, or an arc-shaped (or sine wave shaped) strip electrode, or a jagged (zig-zag shaped) strip electrode.

The plurality of second electrodes 106 may be divided into N number of sub-groups, where each sub-group of second electrodes corresponds to a lens unit and includes M number of the second electrodes 106. Each of the second electrodes 106 in each sub-group of second electrodes connects to different driving voltage sources, respectively. So the number of the driving voltage sources is M and the driving voltage sources are flagged as 1, 2 ... N in turn along one direction. The M number of the second electrodes 106 in each sub-group of the N number of sub-groups are flagged as 1, 2 ... M in turn along the second direction. The second electrode that has the same flag in each sub-group connects to the driving voltage source having the same flag. N is a natural number greater than or equal to 1, and N is a natural number greater than or equal to 2.

Specifically, the first electrode A1 in the first sub-group, the first electrode B1 in the second sub-group, ..., and the first electrode N1 in the Nth sub-group connect to the first driving voltage source; the second electrode A2 in the first sub-group, the second electrode B2 in the second sub-group, ..., and the second electrode N2 in the Nth sub-group connect to the second driving voltage source; the Mth electrode $A_M$ in the first sub-group, the Mth electrode $B_M$ in the second sub-group, ..., and the Mth electrode $N_M$ in the Nth sub-group connect to the Mth driving voltage source.

The number of the first electrodes 108 may be the same as the number of the lens units. The first direction may be perpendicular to the second direction. Therefore, the second electrodes 106 may be perpendicular to the third electrodes 102.

Alternatively, an angle α exists between the second electrode 106 and the third electrode 102, and the angle satisfies $0°<\alpha\leq90°$. Therefore, Moire and color fringes can be eliminated.

The liquid crystal layer 104 is placed between the second electrodes 106 and the third electrodes 102. Specifically, around the edge of the second electrodes 106 and the third electrodes 102, the liquid crystal layer 104 is sealed between the second electrodes 106 and the third electrodes 102 by using a sealant.

In addition, the liquid crystal lens may also include spacer (not shown in FIG. 1) placed between the first alignment layer 105 and the second alignment layer 103, where the spacer is used for ensuring that the distance between the second electrode and the third electrodes is a predetermined distance.

Figure 2A:
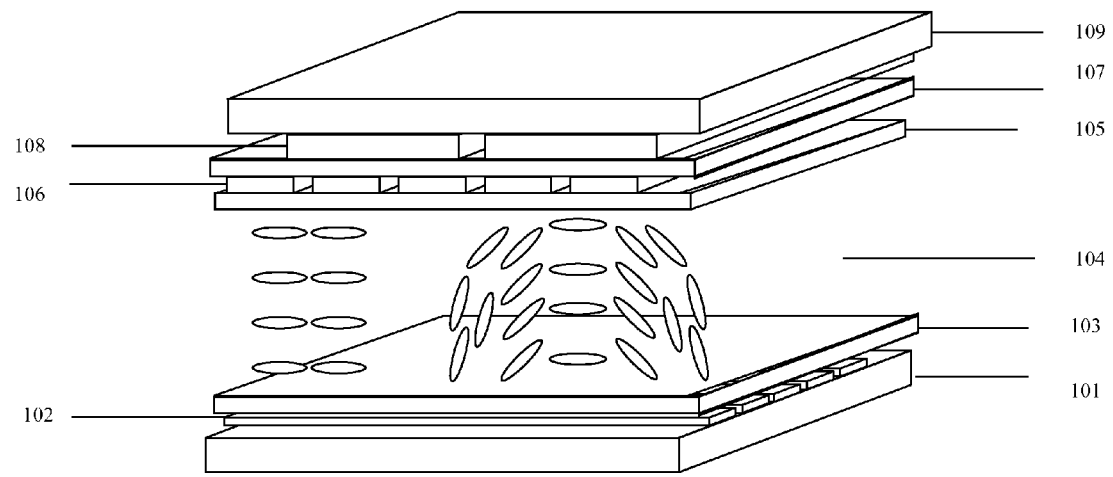
FIG. 2A illustrates a side view of an exemplary liquid crystal lens with strip electrodes consistent with the disclosed embodiments.
Figure 2B:
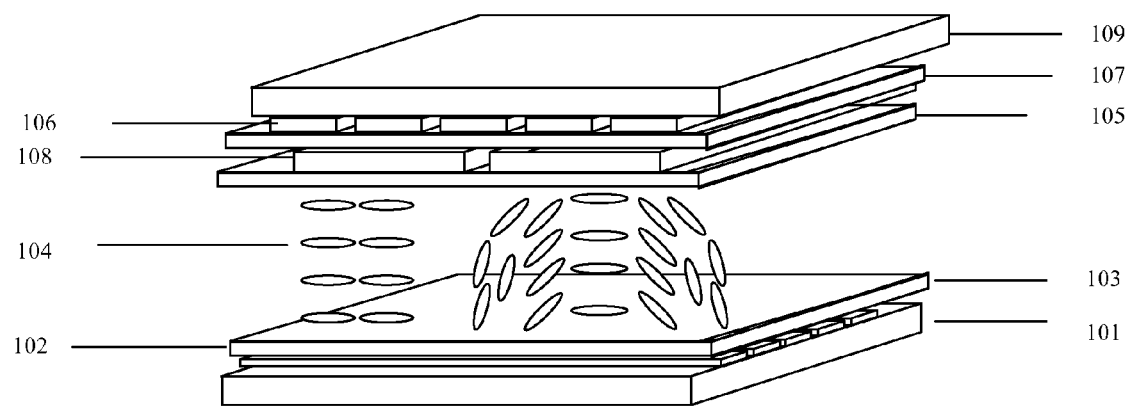
FIG. 2B illustrates a side view of another exemplary liquid crystal lens with strip electrodes consistent with the disclosed embodiments.

FIG. 2A illustrates a side view of an exemplary liquid crystal lens with strip electrodes consistent with the disclosed embodiments; FIG. 2B illustrates a side view of another exemplary liquid crystal lens with strip electrodes consistent with the disclosed embodiments. The difference between FIG. 2A and FIG. 2B includes that the relative position of the first electrodes 108 and the second electrodes 106 is exchanged in FIG. 2B.

Figure 3:
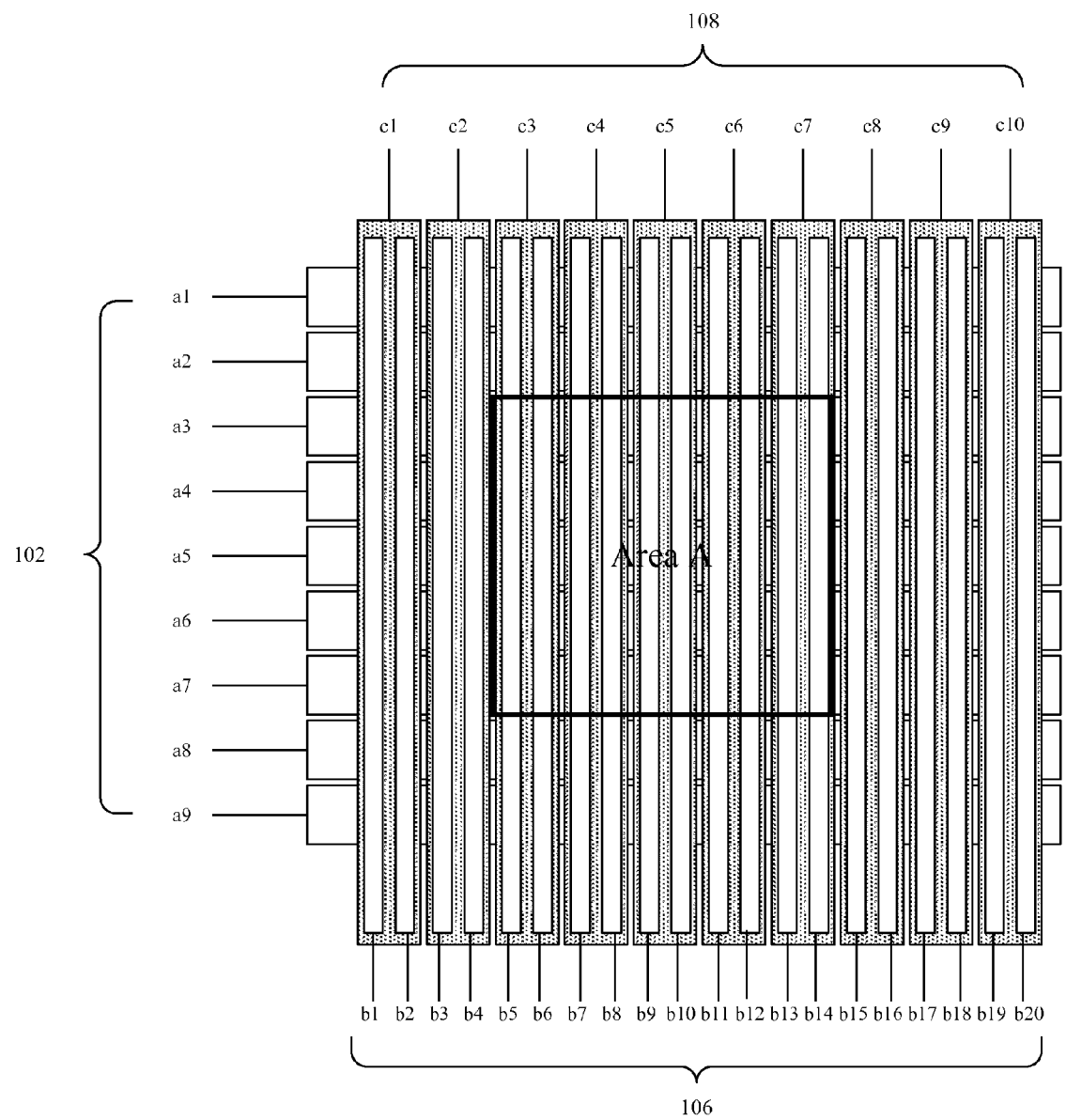
FIG. 3 illustrates a top view of an exemplary drive circuit of a certain lens formed by strip electrodes consistent with the disclosed embodiments.

FIG. 3 illustrates a top view of an exemplary drive circuit of a certain lens formed strip electrodes consistent with the disclosed embodiments. As shown in FIG. 3, in order to simplify the drive circuit, a three-layer electrodes drive mode is utilized herein. A dynamic scan drive mode is avoided, whereas a static drive mode is directly utilized to realize a lens effect. As shown in FIG. 3, a plurality of second electrodes 106 is perpendicular to and crossed a plurality of third electrodes 102, and $a_{ij}$ represents a unit corresponding to intersection of i row and j column (the row or column may be from either second electrodes 106 or third electrode 102). The working principle of the liquid crystal lens is described in detail in the followings.

When an upper electrode and a lower electrode of $a_{ij}$ do not have applied voltages, under the action of a first alignment layer 105 and a second alignment layer 103, liquid crystal molecules in $a_{ij}$ unit are arranged parallel to the surface of the substrate. A polarization direction of incident lights parallels to a friction direction of the substrate. After the polarized lights pass through the $a_{ij}$ unit, the polarization direction of the lights all parallels to the long axis of the liquid crystal molecules. That is, a refractive index is an extraordinary refractive index $n_e$ of the liquid crystal. The refractive index of a substance (optical medium) is a dimensionless number that describes how lights propagate through the medium. Optical path difference (OPD) is not generated when the lights pass through the liquid crystal layer of the $a_{ij}$ unit. The effect is the same as the effect when the lights propagate through a plate glass, and the liquid crystal lens effect is not produced.

When a voltage Ui and a voltage Uj are applied respectively to electrodes in the ith row and electrodes in the jth column at the same time, and the difference between Ui and Uj is greater than a saturation voltage of the liquid crystal layer 104, the liquid crystal molecules in $a_{ij}$ unit are arranged perpendicular to the substrate under the action of the voltage. The polarization direction of the incident lights parallels to the friction direction of the substrate. After the polarized lights pass through the $a_{ij}$ unit, the polarization direction of the lights all parallels to the short axis of the liquid crystal molecules. That is, the refractive index is an ordinary refractive index $n_o$ of the liquid crystal molecules. Optical path difference is not generated when the lights pass through the liquid crystal layer of the $a_{ij}$ unit. The effect is the same as the effect when the lights propagate through a plate glass, and the liquid crystal lens effect is not produced.

When the voltage Ui and the voltage Uj are applied respectively to the ith row electrodes and the jth column electrodes at the same time, and the difference between Ui and Uj is between a threshold voltage of the liquid crystal layer 104 and the saturation voltage of the liquid crystal layer 104, under the action of electric field force, the long axis of the liquid crystal molecules in $a_{ij}$ unit and the normal direction of the substrate form an acute angle β. The polarization direction of the incident lights parallels to the friction direction of the substrate. After the polarized lights pass through the $a_{ij}$ unit, the polarization direction of the lights and the long axis of the liquid crystal molecules form the acute angle β. That is, the refractive index is a value between $n_e$ and $n_o$ of the liquid crystal molecules. Optical path difference is not generated when the lights pass through the liquid crystal layer of the $a_{ij}$ unit. The effect is the same as the effect when the lights propagate through a plate glass, and the liquid crystal lens effect is not produced.

Further, M number of the second electrodes 106 form a group, where M is a natural number, and M≥2. The width of the M number of the second electrodes 106 can be considered as a pitch of a cylindrical lens. Through applying the voltage distributed in a 'U' or 'n' shape gradient to the M number of the electrodes in the pitch of one cylindrical lens, the liquid crystal molecules in the same pitch deflect different angles. Optical path difference is generated when the lights pass through this layer, producing the liquid crystal lens effect.

For example, it is assumed that a sub-group of the second electrodes 106 is formed by 5 second electrodes (one sub-group corresponds to a lens unit) in FIG. 3. That is, the second electrodes b1 to b5 constitute a sub-group and b6 to b10 constitute another sub-group. The corresponding first strip electrode in each lens unit connects to the same driving voltage source (i.e., the first driving voltage source). The corresponding second strip electrode in each lens unit connects to the same driving voltage source (i.e., the second driving voltage source). The corresponding third strip electrode in each lens unit connects to the same driving voltage source (i.e., the third driving voltage source). The corresponding fourth strip electrode in each lens unit connects to the same driving voltage source (i.e., the fourth driving voltage source). The corresponding fifth strip electrode in each lens unit connects to the same driving voltage source (i.e., the fifth driving voltage source).

For example, b1 (the first electrode in the first sub-group of the second electrodes 106) and b6 (the first electrode in the second sub-group of the second electrodes 106) connect to the first driving voltage source; b2 (the second electrode in the first sub-group of the second electrodes 106) and b7 (the second electrode in the second sub-group of the second electrodes 106) connect to the second driving voltage source; b3 (the third electrode in the first sub-group of the second electrodes 106) and b8 (the third electrode in the second sub-group of the second electrodes 106) connect to the third driving voltage source; b4 (the fourth electrode in the first sub-group of the second electrodes 106) and b9 (the fourth electrode in the second sub-group of the second electrodes 106) connect to the fourth driving voltage source; b5 (the fifth electrode in the first sub-group of the second electrodes 106) and b10 (the fifth electrode in the second sub-group of the second electrodes 106) connect to the fifth driving voltage source.

The voltages U1, U2, U3, U4, and U5 are applied on the first to the fifth driving voltage source, respectively. The voltage applied on the third electrodes 102 (also known as public electrodes) is equal to 0V. These voltage values satisfy $|U1|>|U2|>|U3|\geq 0V$ and $|U5|>|U4|>|U3|\geq 0V$. Therefore, each absolute voltage value is distributed in a 'U' shape. Under this voltage relationship, the liquid crystal molecules in each lens unit can form the liquid crystal lens effect driven by gradient electric field force which is approximately symmetrical about intermediate electrode. After the second electrodes 106 are applied the above voltages, the liquid crystal lens effect is produced in the whole display area.

Further, when the liquid crystal molecules form multiple lens units with refractive indexes of the liquid crystal molecules distributed in a gradient of refractive index, a 3D image may be displayed. When the refractive indexes of the liquid crystal molecules are not distributed in a gradient of refractive index (that is, the liquid crystal molecules are vertical, horizontal, or have a certain deflection angle), a 2D image may be displayed.

Thus, the design of the driving circuit in the present disclosure is different from the existing techniques. In the existing techniques, each electrode needs to be controlled by a separate chip. In the two-dimensional/three dimensional (2D/3D) image display device provided in the present disclosure, the number of driver chips is reduced, and the drive complexity is reduced. Therefore, the cost of the 2D/3D display device is reduced.

In addition, in FIG. 3, for illustration purposes, for the first electrode 108 of the liquid crystal lens in the present disclosure, only 10 strips of the first electrodes C1-C10 are used as an example. In practical application, the number of the first electrodes is not limited.

As shown in FIG. 3, 10 strips of the first electrodes 108 and 9 strips of the third electrodes 102 (i.e., a1 to a9) divide the liquid crystal lens into 9×10 units. The 9×10 units can be regarded as an array of 9×10 two-dimensional (2D) lens units. The row of the 2D matrix represents the third electrodes 102, and the column of the 2D matrix represents the first electrodes 108. It is assumed that voltages applied on a3-a7 of the first electrodes and c3-c7 of the first electrodes are all 0, and the voltage difference of the upper electrode and the lower electrode of the cross area (i.e., area A shown in FIG. 3) of the two electrodes is an absolute value of the voltage previously applied on b5-b14. The difference between the second electrodes 106 and the third electrodes 102 is kept unchanged. At this time, the liquid crystal molecules in area A keep the state under gradient electrical field force, and a lens effect is produced.

At the same time, the voltage applied on other third electrodes 102 (e.g., a1, a2, a8, and a9) is V1, and the voltage applied on the first electrodes 108 (e.g., c1, c2, c8, and c10) is V3, such that the voltage differences between the third electrodes 102 and the first electrodes 108 (except the area A) are: $|V1|$, $|V3|$, and $|V1-V3|$, respectively. The values of the three voltage differences can offset the gradient electric field generated by the second electrodes 106 to produce a non-lens effect by selecting the appropriate V1 and V2, where an option is that the minimum value of $|V1|$, $|V3|$, and $|V1-V3|$ is greater than the saturation voltage of the liquid crystal.

The electrode drive mode can produce a refraction effect and a non-refraction effect (i.e., parallel emergent effect) of the lens at the same time when the lights propagate through the liquid crystal lens.

Figure 4:
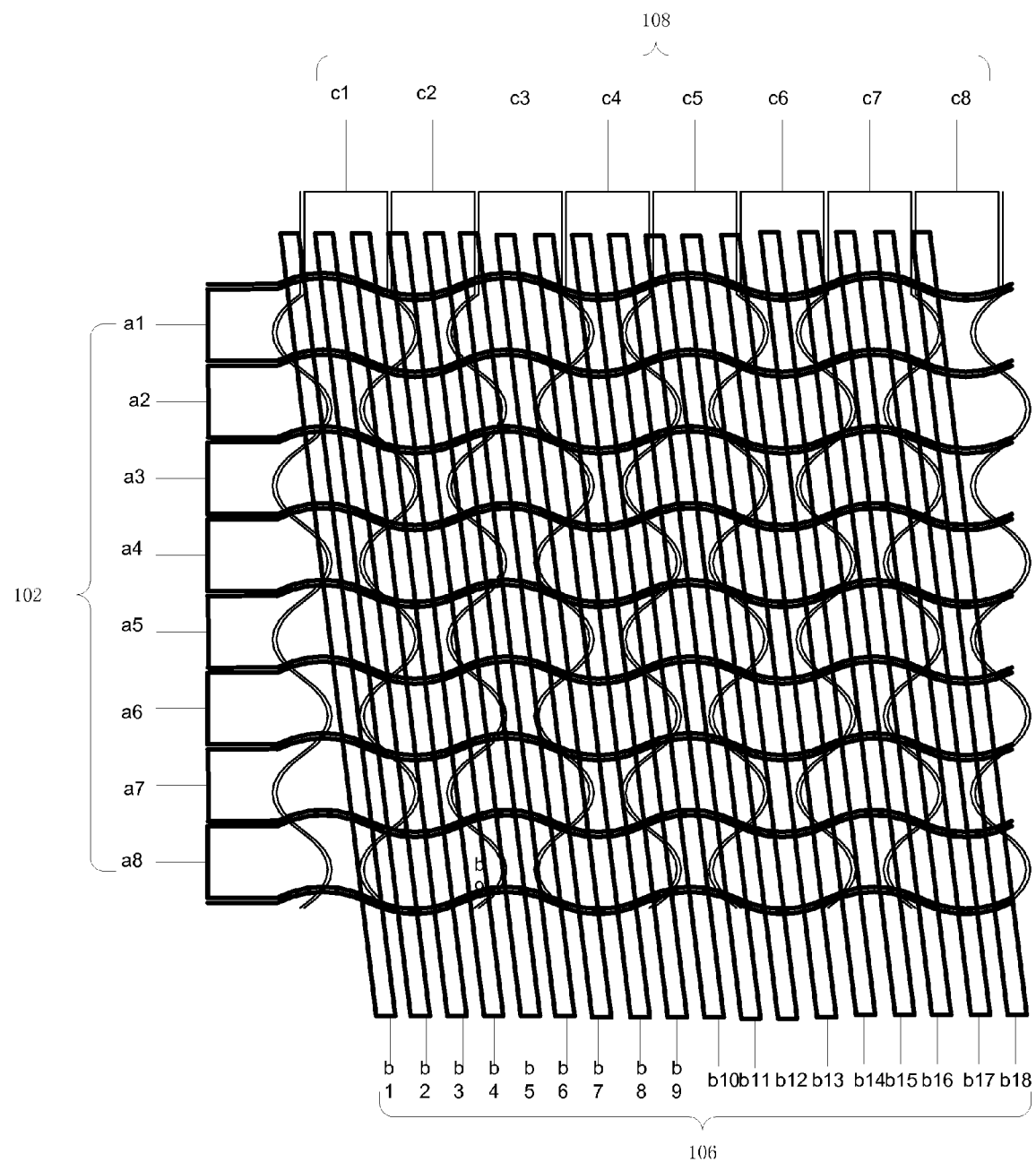
FIG. 4 illustrates a top view of an exemplary arc-shaped strip electrode consistent with the disclosed embodiments.

The strip second electrodes 106 are arranged with equal space intervals, a spatial periodical structure similar to pixel arrangement on the display panel. Thus, during display operation, it may be easy to produce optical interference, which may cause Moiré fringe and color fringe in the viewing area, affecting the 3D display effects. In addition, bright lines appear along the strip electrodes. To reduce the effect of Moiré fringe, the color fringe, and the bright lines on the stereoscopic display, arc-shaped strip electrodes are used herein. FIG. 4 illustrates a top view of an exemplary arc-shaped strip electrode consistent with the disclosed embodiments.

As shown in FIG. 4, second electrodes 106 are disposed in a tilted angle, and an angle α between the second electrodes 106 and the horizontal direction is set to satisfy $0°<\alpha\leq 90°$. Thus, Moiré fringe and color fringe can be effectively eliminated.

In addition, the first electrodes 108 and the third electrodes 102 can be set to arc-shaped electrodes to eliminate bright lines among the electrodes. Moiré fringe can also be effectively eliminated, improving the display quality.

Further, the shape of the first electrodes 108 and the third electrodes 102 can also be a jagged strip. The drive mode in FIG. 4 is the same as the drive mode in FIG. 3, which is not repeated herein.

Figure 5:
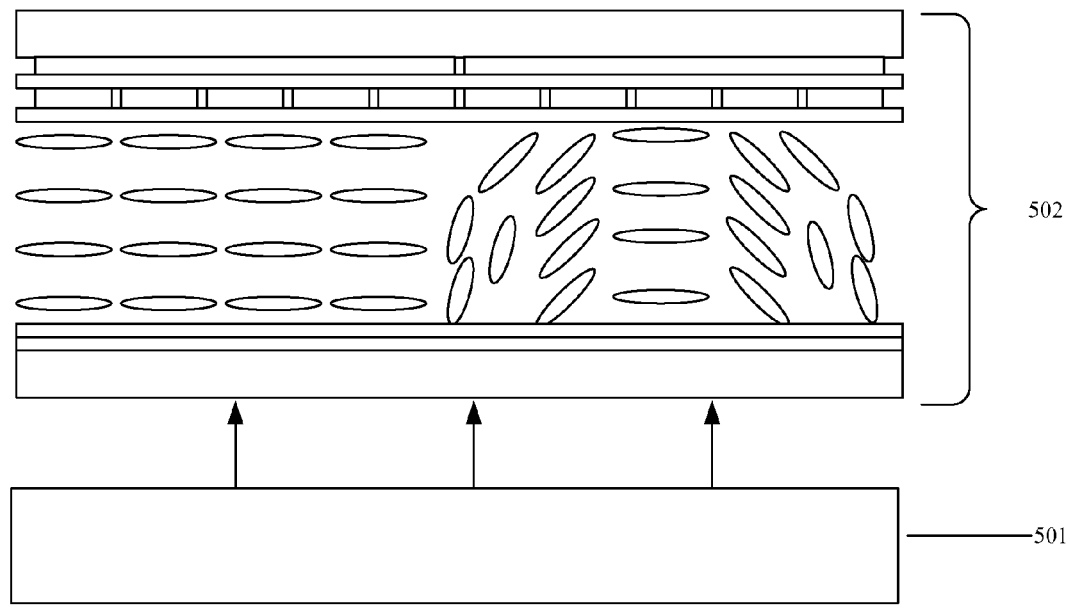
FIG. 5 illustrates a structure schematic diagram of an exemplary 2D/3D display device consistent with the disclosed embodiments.

FIG. 5 illustrates a structure schematic diagram of an exemplary 2D/3D display device consistent with the disclosed embodiments. As shown in FIG. 5, along the direction of light propagation, the 2D/3D display device includes at least a display panel 501 for providing images and an above-described liquid crystal lens 502. The lights emitted by the display panel 501 are linearly polarized lights. The 2D/3D display device can achieve the three-dimensional display effect and the two-dimensional display effect in an integrated mode. That is, the 2D/3D display device provided in the present disclosure may simultaneously display the 2D images and the 3D images by providing different driving voltages to electrodes. It also ensures that no Moiré fringe and color fringe exist when displaying the 2D/3D images, greatly improving the display quality.

Figure 6:
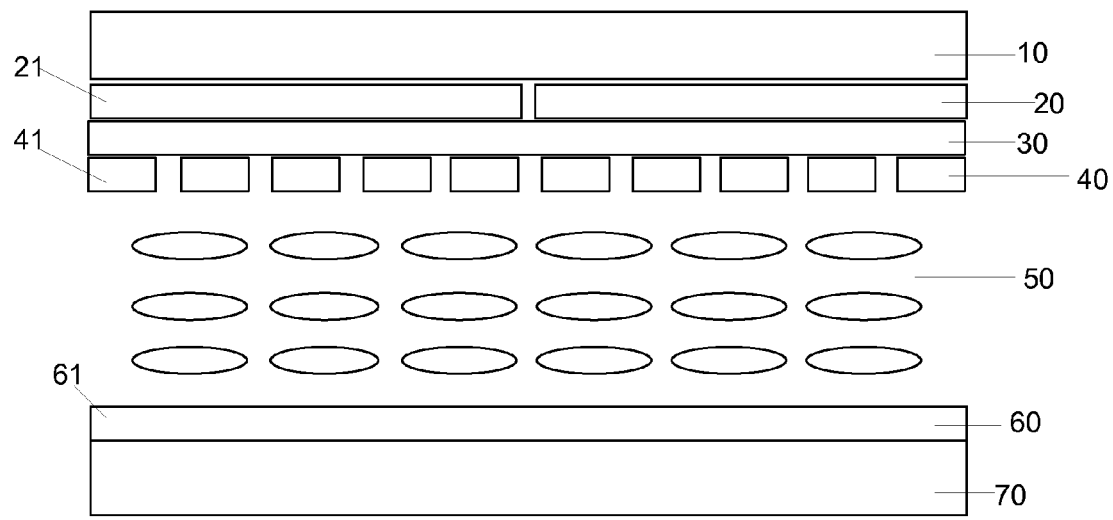
FIG. 6 illustrates a structure diagram of an exemplary 2D/3D display device consistent with the disclosed embodiments.

FIG. 6 illustrates a structure diagram of another exemplary 2D/3D display device consistent with the disclosed embodiments. As shown in FIG. 6, the 2D/3D display device may include a first substrate 10, a second substrate 70, a first electrode section or group 20, an insulating layer 30, a second electrode section or group 40, a liquid crystal layer 50, and a third electrode section or group 60.

The first substrate 10 and the second substrate 70 are placed generally parallel. The first electrode section 20, the insulating layer 30, the second electrode section 40, the liquid crystal layer 50 and the third electrode section 60 are placed in turn between the first substrate 10 and the second substrate 70. The liquid crystal layer 50 includes a plurality of liquid crystal molecules having birefringence or optical anisotropy. The first electrode section 20 and the second electrode section 40 are place on the same side of the liquid crystal layer 50, while the third electrode section 60 is place on the other side of the liquid crystal layer 50.

In addition, the second electrode section 40 is arranged to face the first electrode section 20, and the second electrode section 40 includes a plurality of the second electrodes 41 distributed in an array manner, where one liquid crystal lens unit includes M number of the second electrodes 41, and M is a natural number greater than or equal to 2. The first electrode section 20 includes a plurality of the first electrodes 21 distributed in an array manner; where the first electrodes 21 and the second electrodes 41 extend along the same direction, and each of the first electrodes 21 covers at least one liquid crystal lens unit. That is, one first electrode unit 21 corresponds to a plurality of the second electrodes 41. The third electrode section 60 includes a plurality of strip third electrodes 61, and each of the third electrodes 61 is inter-disposed with or cross over a plurality of the first electrodes 21.

The combination of the first electrode section 20 and the second electrode section 40 may be used to provide a channel for applying a threshold voltage and high voltages on the liquid crystal layer 50, such that vertical electric fields are formed on the two sides of the liquid crystal layer 50. The driving voltages applied on various second electrodes 41 of the second electrode section 40 are different, so horizontal electric fields are formed between the adjacent second electrodes 41. Under mutual influence of the vertical electric fields and the horizontal electric fields, the liquid crystal molecules of the liquid crystal layer 50 may deflect in a specific direction. Thus, refractive indexes of multiple liquid crystal molecules can be configured in a gradient so as to form a lens structure. The lights passing through the lens structure generate optical path difference, such that the emergent lights of different pixels of the display device are refracted into the human eyes according to different directions. After signals are processed by the brain, the 3D image can be formed.

Therefore, compared to the existing technologies, the 2D/3D display device adds the first electrode section 20 (control electrode section). The combination of the first electrode section 20 and the second electrode section 40 may be used to provide a channel for applying a threshold voltage and high voltages on the liquid crystal layer 50 to drive the liquid crystal molecules of the liquid crystal layer 50 to rotate and to be arranged in a specific manner. Thus, when a display frame of the display device is switched from a 3D image to a 2D image, only the driving voltages applied on the first electrode section 20 need to be adjusted, and the driving voltages applied on the second electrode section 40 do not need to be adjusted. The liquid crystal lens distributed with gradient voltages formed by the driving voltages applied on the second electrode section 40 is destroyed by the driving voltages applied on the first electrode section 20. Therefore, circuit structure is simple, and it is easy to implement the control mode.

Specifically, the first electrode section 20, the second electrode section 40 and the third electrode section 60 form a transparent electrode section which can be made from indium tin oxide (ITO), indium zinc oxide (IZO), alumina zinc oxide (AZO) or gallium zinc oxide (GZO), etc. The first substrate 10 and the second substrate 70 form a transparent substrate. The insulated layer 30 can be made from silicon dioxide, silicon oxynitride, silicon nitride, etc.

Figure 7:
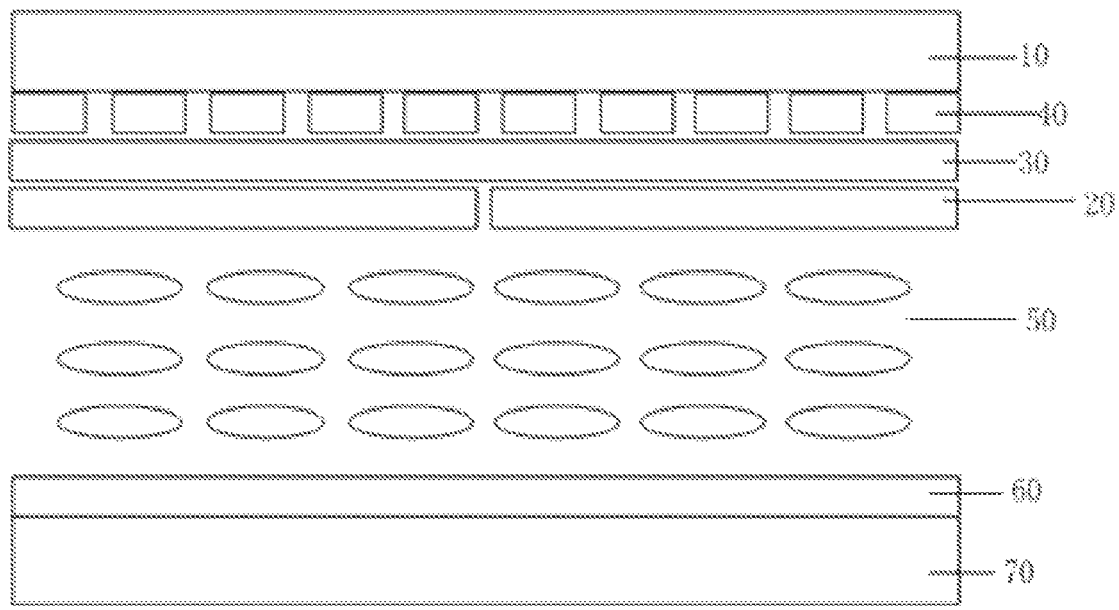
FIG. 7 illustrates a structure diagram of another exemplary 2D/3D display device consistent with the disclosed embodiments.

FIG. 7 illustrates a structure diagram of another exemplary 2D/3D display device consistent with the disclosed embodiments. As shown in FIG. 7, compared to the 2D/3D display device shown in FIG. 6, the position of first electrode section 20 is exchanged with the position of second electrode section 40. The 2D/3D display device shown in FIG. 7 can implement the same display effect as the device shown in FIG. 6.

Using the 2D/3D display device in FIG. 6 as an example, the driving method for 2D/3D display is described in details as the followings.

Figure 8:
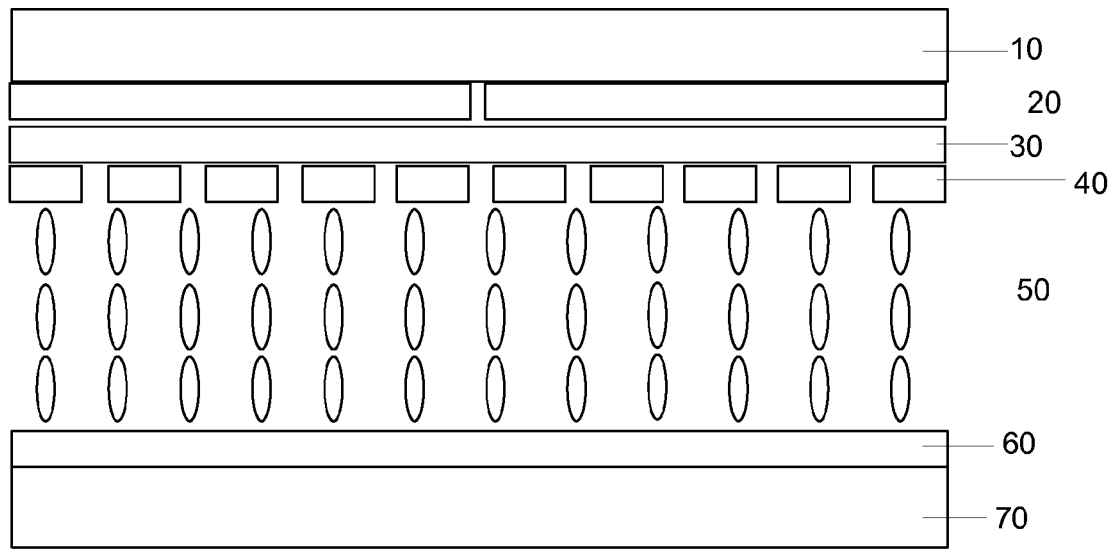
FIG. 8 illustrates state of liquid crystal molecules of an exemplary 2D/3D display device in a 2D mode consistent with the disclosed embodiments.
Figure 9:
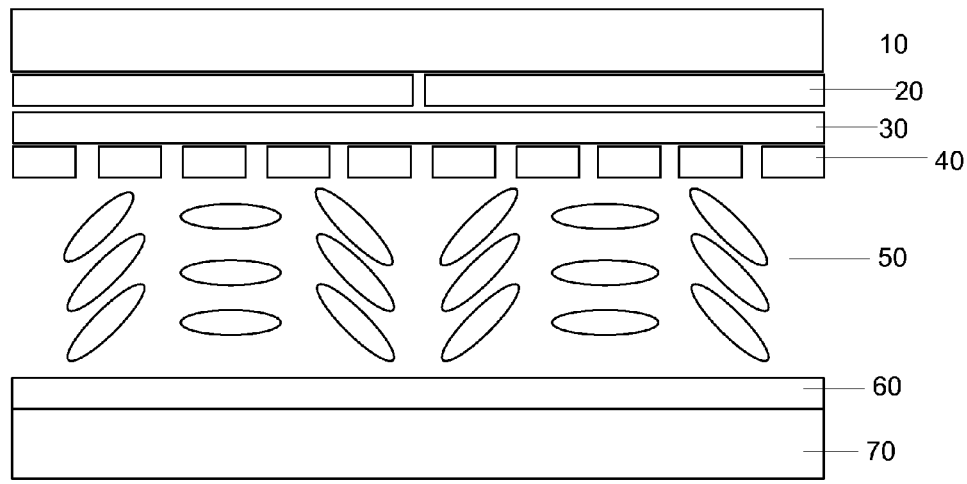
FIG. 9 illustrates state of liquid crystal molecules of an exemplary 2D/3D display device in a 3D mode consistent with the disclosed embodiments.
Figure 10:
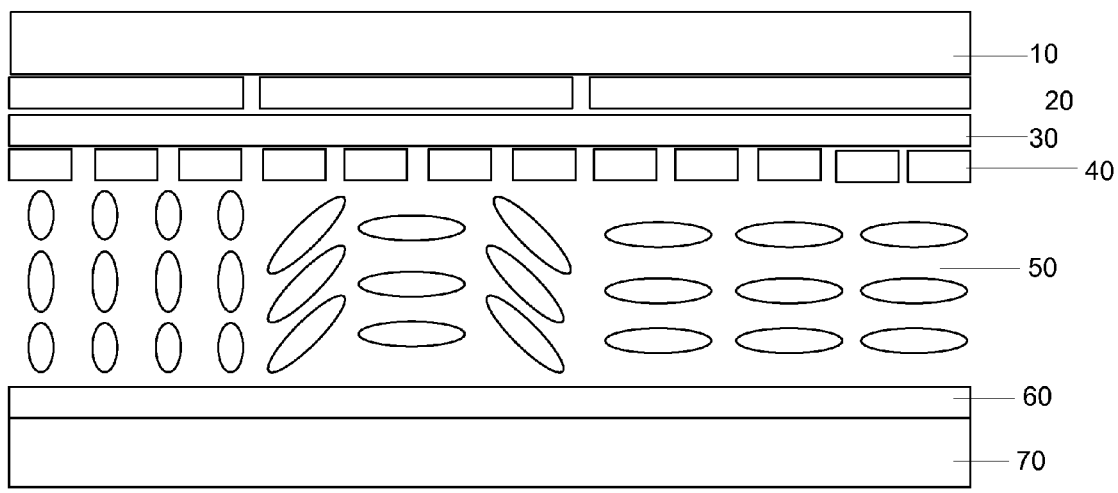
FIG. 10 illustrates a schematic diagram of an exemplary state of liquid crystal molecules when 2D display and 3D display are coexistent using a 2D/3D display device shown in FIG. 6 consistent with the disclosed embodiments.
Figure 11:
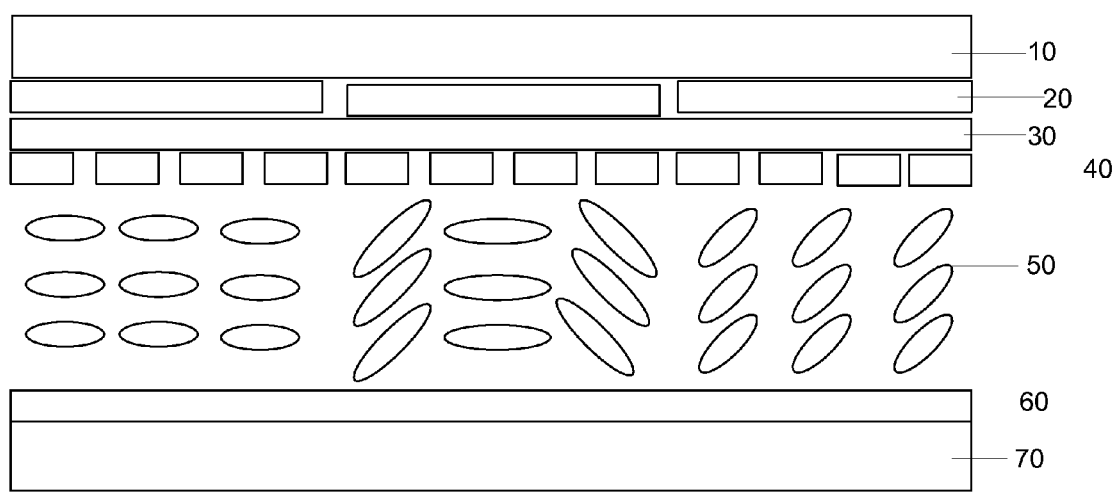
FIG. 11 illustrates a schematic diagram of another exemplary state of liquid crystal molecules when 2D display and 3D display are coexistent using a 2D/3D display device shown in FIG. 6 consistent with the disclosed embodiments.

FIG. 8 illustrates a schematic diagram of an exemplary state of liquid crystal molecules when implementing a full-screen 2D display mode using the 2D/3D display device shown in FIG. 6 consistent with the disclosed embodiments. FIG. 9 illustrates a schematic diagram of an exemplary state of liquid crystal molecules when implementing a full-screen 3D display mode using the 2D/3D display device shown in FIG. 6 consistent with the disclosed embodiments. FIG. 10 illustrates a schematic diagram of an exemplary state of liquid crystal molecules when 2D display and 3D display are coexistent using a 2D/3D display device shown in FIG. 6 consistent with the disclosed embodiments. FIG. 11 illustrates a schematic diagram of another exemplary state of liquid crystal molecules when 2D display and 3D display are coexistent using a 2D/3D display device shown in FIG. 6 consistent with the disclosed embodiments.

To implement the state of liquid crystal molecules in FIG. 6, FIG. 8, FIG. 9, FIG. 10, and FIG. 11, the applied driving methods are different. When the voltage differences among the first electrode section 20, the second electrode section 40 and the third electrode section 60 are greater than a saturation voltage of the liquid crystal layer, the liquid crystal molecules in the 2D/3D display device rotate for 90° (i.e., verticality), forming the state of liquid crystal molecules shown in FIG. 8.

When the voltage differences among the first electrode section 20, the second electrode section 40 and the third electrode section 60 are less than Uth (Uth is a threshold voltage of the liquid crystal layer), the liquid crystal molecules in the 2D/3D display device are not rotated (i.e., horizontality), forming the state of liquid crystal molecules in FIG. 6.

When the second electrodes 41 included in one liquid crystal lens unit on the second electrode section 40 are applied by gradient voltages, and the voltages applied on the first electrode section 20 and the third electrode section 60 do not affect the gradient voltages, then a lens unit of the gradient voltages distribution is formed, with the states shown in FIG. 9, FIG. 10 and FIG. 11 are formed. Thus, the liquid crystal lens area having the gradient voltage distribution forms 3D display area. The driving methods in the above figures are described in details as the followings. The gradient voltage is a 'U' or 'n' shape.

Therefore, by comparing FIGS. 6, 8 to 11, when the gradient voltages are applied on the second electrodes 41 on the second electrode section 40, and the voltages applied on the first electrode section 20 and the third electrode section 60 do not affect voltages applied on the second electrode section 40, liquid crystal refractive index forms a liquid crystal lens distributed in a gradient. Thus, the selected area may display 3D images. When the liquid crystal molecules are vertical, horizontal, or have a certain deflection angle, as long as the liquid crystal lens having gradient voltage distribution is not formed, the selected area may display 2D images.

Based on the received image display adjustment signals, voltage output modules provide the driving voltages for the first electrode section 20, the second electrode section 40 and the third electrode section 60. When the liquid crystal molecules in the 3D display area corresponding to 3D display area position information form multiple lens units with refractive indexes of the liquid crystal molecules distributed in a gradient, the 3D image may be displayed. When the refractive indexes of the liquid crystal molecules in the 2D display area corresponding to 2D display area position information are not distributed in a gradient (that is, the liquid crystal molecules are vertical, horizontal, or have a certain deflection angle), the 2D image may be displayed.

Figure 12:
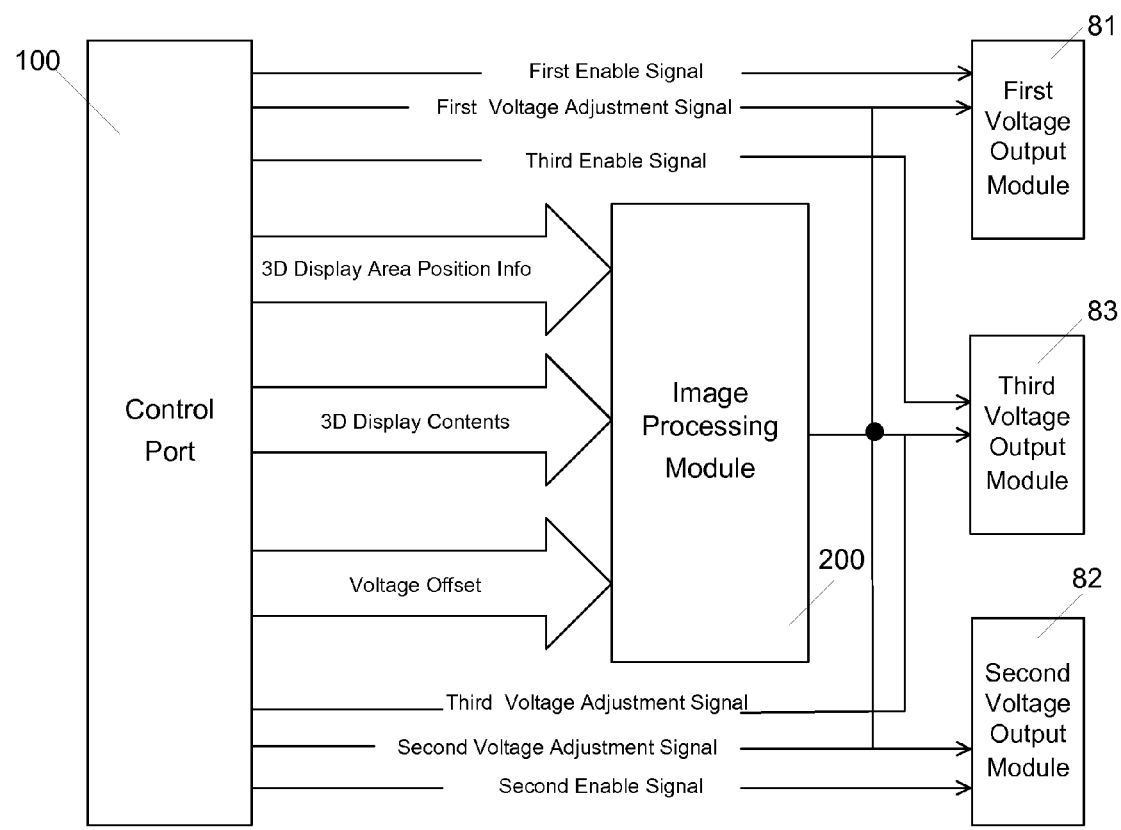
FIG. 12 illustrates a block diagram of an exemplary driving unit consistent with the disclosed embodiments.

FIG. 12 illustrates a block diagram of an exemplary driving unit consistent with the disclosed embodiments. As shown in FIG. 12, voltage output modules provide respectively driving voltages for the first electrode section 20, the second electrode section 40 and the third electrode section 60, and further receive image display adjustment signals. Based on the received image display adjustment signals, the driving voltages outputted to the first electrode section 20, the second electrode section 40 and the third electrode section 60 are adjusted.

Specifically, the voltage output modules include a first voltage output module 81, a second voltage output module 82, and a third voltage output module 83. The first voltage output module 81, the second voltage output module 82, and the third voltage output module 83 may include any appropriate driving circuitry to provide one or more voltages to a 2D/3D display device. The first voltage output module 81, the second voltage output module 82, and the third voltage output module 83 connect to a control port 100 and an image processing module 200 of the display device, respectively.

Further, the 3D display device may also send the 3D display area position information, 3D display contents and voltage offset of image adjustment to the image processing module 200 for further processing. The image processing module 200 may include any appropriate device capable of processing received information and providing control signals to the first voltage output module 81, the second voltage output module 82, and the third voltage output module 83.

For example, the image processing module 200 may include a processor such as a graphic processing unit (GPU), a general purpose microprocessor, a digital signal processor (DSP) or a microcontroller, and application specific integrated circuit (ASIC). The image processing module 200 may also include other devices such as memory devices, communication devices, input/output devices, driving circuitry, and storage devices, etc. The image processing module 200 receives the 3D display area position information, the 3D display contents and the voltage offset of image adjustment by the control port 100. Based on the image display adjustment signals, the 2D display area position information and/or the 3D display area position information is calculated.

Therefore, in operation, the first voltage output module 81 provides the first driving voltage to the first electrode section 20 under the control of a first enable signal inputted from the control port 100. The second voltage output module 82 provides the second driving voltage to the second electrode section 40 under the control of a second enable signal inputted from the control port 100. The third voltage output module 83 provides the third driving voltage to the third electrode section 60 under the control of a third enable signal inputted from the control port 100. Further, the first voltage output module 81 may receive a first voltage adjustment signal to dynamically adjust the driving voltages output to the first electrodes 21. The second voltage output module 82 may receive a second voltage adjustment signal to dynamically adjust the driving voltages output to the second electrodes 41. The third voltage output module 83 may receive a third voltage adjustment signal to dynamically adjust the driving voltages output to the third electrodes 61. In the 3D mode, the shape of the second electrode voltages corresponding to each lens unit is a 'U' or 'n' shape.

Using the 2D/3D display device in FIG. 6 as an example, the driving methods for 2D/3D display in a full-screen 2D mode, a full-screen 3D mode, and a 2D/3D point-by-point mode are respectively described in details as the followings.

Figure 13:
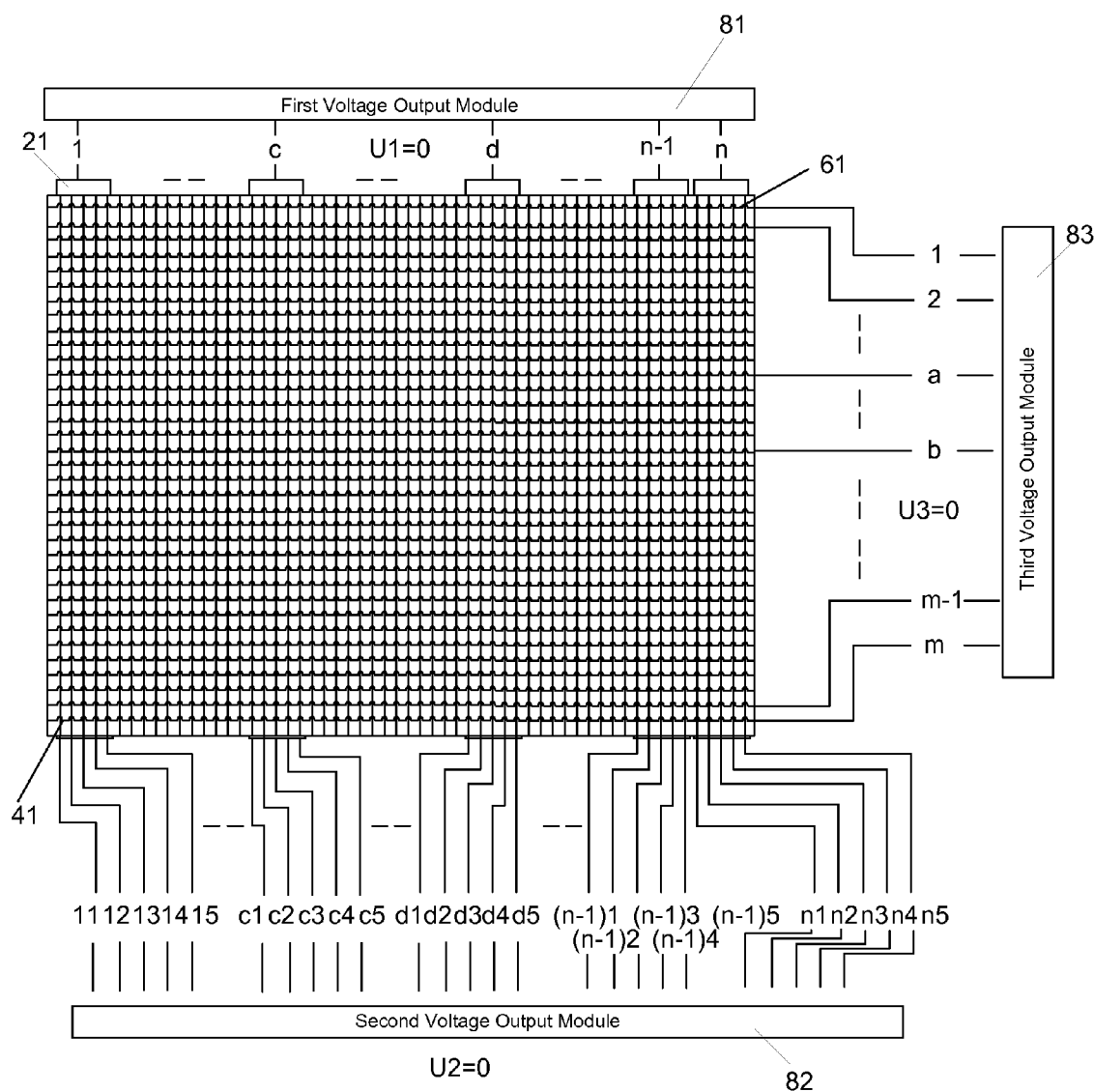
FIG. 13 illustrates a structure diagram of an exemplary circuit when implementing a full-screen 2D display mode consistent with the disclosed embodiments.

FIG. 13 illustrates a structure diagram of an exemplary circuit when implementing a full-screen 2D display mode consistent with the disclosed embodiments. As shown in FIG. 13, the second electrodes 41 in the second electrode section 40 are grouped by 5. That is, five (5) consecutive second electrodes (as an example) may form one liquid crystal lens unit.

Specifically, n groups of second electrodes 41 include (11, 12, 13, 14, 15), . . . (c1, c2, c3, c4, c5), . . . (d1, d2, d3, d4, d5), . . . ((n−1)1, (n−1)2, (n−1)3, (n−1)4, (n−1)5), (n1, n2, n3, n4, n5).

A total number of n groups of second electrodes 41 are arranged from left to right correspondingly, 1 . . . c . . . d . . . n−1, n, where n is an integer. The five (5) second electrodes 41 included in one lens unit connect to the second voltage output module 82, respectively. The first electrodes 21 in the first electrode section 20 cover one lens unit and connect respectively to the first voltage output module 81.

As shown in FIG. 13, the first electrode section 20 includes n number of first electrodes 21. A total n number of first electrodes 21 are arranged from left to right correspondingly, 1 . . . c . . . d . . . n−1, n, where n is an integer. The third electrodes 61 in the third electrode section 60 are inter-disposed with the second electrodes 41, connecting respectively to the third voltage output module 83. A total number of m number of third electrodes 61 in the third electrode section 60 are arranged correspondingly, 1, 2, . . . , a, b, . . . (m−1), m, where m is an integer.

When the 2D/3D display device 800 displays the image in a full-screen 2D mode, the image display adjustment signals received by the image processing module 200 do not include the 3D display area position information. At this time, the driving method includes the followings.

A first voltage U1 is applied on all first electrodes through the first voltage output module 81; a second voltage U2 is applied on all second electrodes through the second voltage output module 82; and a third voltage U3 is applied on all third electrodes through the third voltage output module 83. A first voltage difference exists between the first voltage U1 and the third voltage U3. A second voltage difference exists between the second voltage U2 and the third voltage U3. Both the first voltage difference and the second voltage difference are less than or equal to Uth, where Uth is a threshold voltage of the liquid crystal layer. That is, |U1−U3|<=Uth, |U2−U3|<=Uth. Under the driving control mode, the rotation of the liquid crystal molecules of the liquid crystal layer 50 is not started, and the effect of the liquid crystal lens is not formed. Thus, the display device is in the full-screen 2D display mode.

Optionally, when U1=U2=U3=0V, or no voltage is applied on the first electrodes 21, the second electrodes 41 and the third electrodes 61, not only the 2D display effect is realized, but also the power is saved.

Figure 14:
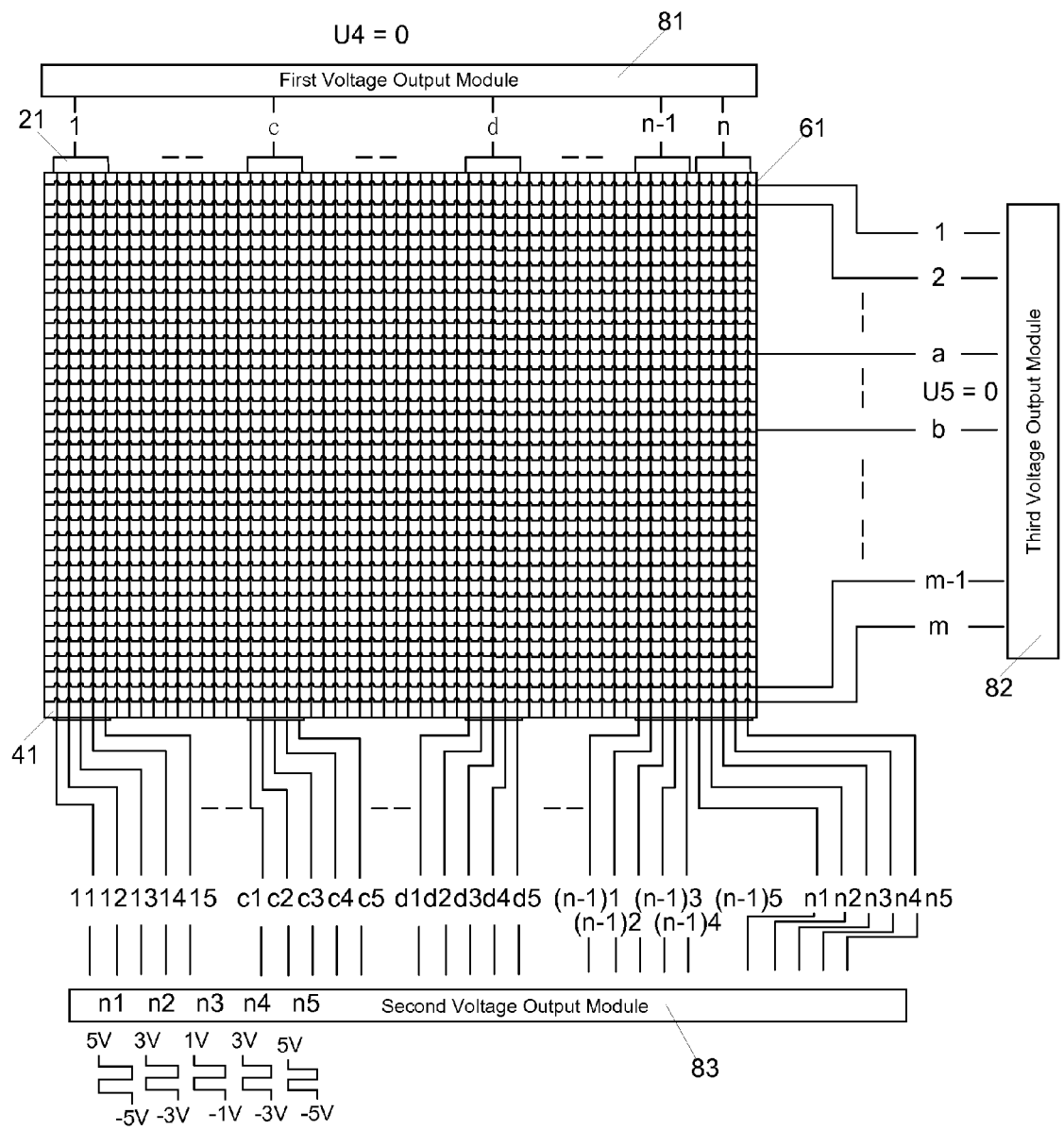
FIG. 14 illustrates a structure diagram of an exemplary circuit when implementing a full-screen 3D display mode consistent with the disclosed embodiments.

FIG. 14 illustrates a structure diagram of an exemplary circuit when implementing a full-screen 3D display mode consistent with the disclosed embodiments. As shown in FIG. 14, the second electrodes 41 in the second electrode section 40 are grouped by 5. That is, 5 second electrodes 41 (as an example) form one liquid crystal lens unit. The second voltage output module 82 applies various voltages on individual second electrodes 41 in each electrode group. For example, Un1, Un2, Un3, Un4, and Un5 are applied on the 5 number of second electrodes 41 (n1, n2, n3, n4, n5) in one liquid crystal lens unit, respectively. The voltages applied on different second electrode unit 41 are different. The various voltages may be controlled to satisfy the following conditions:

$$|Un1|>|Un2|>|Un3|, \text{ and } |Un5|>|Un4|>|Un3| \quad (1)$$

Based on formula (1), in each liquid crystal lens unit, the absolute values of the various voltage values on the second electrodes 41 are arranged as "U" shaped segments.

In addition, the first voltage output module 81 applies a fourth voltage U4 on individual first electrodes 21, and the third voltage output module 83 applies a fifth voltage U5 on individual third electrodes 61.

Optionally, the fourth voltage U4 and the fifth voltage U5 are direct current (DC) voltages, while the voltages applied on the second electrodes 41 are alternating current (AC) voltages changed periodically, for example, a periodic square wave voltage.

Further, in order to implement a full-screen 3D mode, the fifth voltage U5 applied on the third electrodes 61 and the fourth voltage U4 applied on the first electrodes 21 are compared respectively with the various voltages applied on the second electrodes 41 and are controlled to satisfy:

$$|Un1-U5|>=Uth, \text{ and } |Un5-U5|>=Uth \quad (2)$$

$$|Un1-U4|>=Uth, \text{ and } |Un5-U4|>=Uth \quad (3)$$

$$|U4-U5|<Uth \quad (4)$$

When Un1, Un2, Un3, Un4, and Un5 are positive voltages, respectively:

$$(Un1-U5)>(Un2-U5)>(Un3-U5)>=0, \text{ and } (Un5-U5)>(Un4-U5)>(Un3-U5)>=0 \quad (5)$$

$$(Un1-U4)>(Un2-U4)>(Un3-U4)>=0, \text{ and } (Un5-U4)>(Un4-U4)>(Un3-U4)>=0 \quad (6)$$

When Un1, Un2, Un3, Un4, and Un5 are negative voltages, respectively:

$$(Un1-U5)<(Un2-U5)<(Un3-U5)<=0, \text{ and } (Un5-U5)<(Un4-U5)<(Un3-U5)<=0 \quad (7)$$

$$(Un1-U4)<(Un2-U4)<(Un3-U4)<=0, \text{ and } (Un5-U4)<(Un4-U4)<(Un3-U4)<=0 \quad (8)$$

Based on formulas (2)-(8), the absolute values of Un1, Un2, Un3, Un4, and Un5 in various liquid crystal lens units are arranged as "U" shaped segments, decreasing successively from the first second electrode unit 41 to the third second electrode unit 41 (from left to right) and decreasing successively from the fifth second electrode unit 41 to the third second electrode unit 41 (from right to left).

In addition, the absolute values of the various voltage values on the second electrodes 41 in various lens units are greater than the voltage value U5 on the third electrode section 60; the absolute values of the various voltage values on the second electrodes 41 in various lens units are greater than voltage value U4 on the first electrode section 20; and the absolute value of the voltage difference between the voltage value U4 on the first electrode section 20 and the voltage value U5 on the third electrode section 60 is less than Uth, where Uth is a threshold voltage of the liquid crystal layer. Thus, the voltage difference of the two sides of the liquid crystal layer is greater than Uth. Therefore, the liquid crystal molecules are rotated, enabling the refractive indexes of liquid crystal molecules to be distributed in a gradient. Thus, gradient electric field forces enable the liquid crystal molecules in the liquid crystal layer 50 to form the effect of the liquid crystal lens distributed in the gradient voltages, realizing 3D display.

For example, in one embodiment, the various voltages may be configured as: Un1 =Un5>Uth, Un2=Un4, and |Un1|>|Un2|>|Un3|, where Un1=Un5 being a periodic square wave voltage from −5V to +5V; Un3 may be a periodic square wave voltage from −1V to +1V; U5=0V; and U4=0V.

The above second electrodes 41 in the second electrode section 40 are grouped by 5. That is, 5 second electrodes (as an example) are used to form one liquid crystal lens unit in a full-screen 3D mode. It should be noted that the number of the second electrodes 41 included in one liquid crystal lens unit is not limited to 5, and the number of the second electrodes 41 included in one liquid crystal lens unit may be any odd number greater than 1.

When the number of the second electrodes 41 included in one liquid crystal lens unit is M, the driving voltages in various electrodes satisfy the following conditions.

The fourth voltage value U4 is applied on each of the first electrodes in the 3D display area, and the fifth voltage value U5 is applied on each of the third electrodes in the 3D display area. The driving voltages are applied on the second electrodes corresponding to each lens unit in the 3D display area in a predetermined mode, where the driving voltages applied on each of the second electrodes corresponding to each lens unit in the 3D display area are different.

The method for providing driving voltages for the second electrodes corresponding to each lens unit in the 3D display area in the predetermined mode includes the followings.

The driving voltages (from the first driving voltage value Un1 to the Mth driving voltage value Unm) are respectively provided for the corresponding second electrodes (from the first second electrode unit to the Mth second electrode unit). The driving voltages (from the first driving voltage value Un1 to the Mth driving voltage value Unm) are periodic square wave voltages and satisfy the following conditions:

$$|Un1|>|Un2|> \ldots >|Un((M+1)/2)|,$$
$$\text{and } |Unm|> \ldots >|Un((M+1)/2+1)|>$$
$$|Un((M+1)/2)| \quad (9)$$

$$|Un1-U5|>Uth, \text{ and } |Unm-U5|>Uth \quad (10)$$

$$|Un1-U4|>Uth, |Unm-U4|>Uth, \text{ and } |U4-U5|<Uth \quad (11)$$

When the driving voltages (from the first driving voltage value Un1 to the Mth driving voltage value Unm) are positive voltages:

$$(Un1-U5)>(Un2-U5)> \ldots >(Un((M+1)/2)-U5)>=0,$$

$$(Unm-U5)> \ldots >(Un((M+1)/2+1)-U5)>(Un((M+1)/2)-U5)>=0,$$

$$(Un1-U4)>(Un2-U4)> \ldots >(Un((M+1)/2)-U4)>=0,$$
and $$(Unm-U4)> \ldots >(Un((M+1)/2+1)-U4)>(Un((M+1)/2)-U4)<=0 \quad (12)$$

When the driving voltages (from the first driving voltage value Un1 to the Mth driving voltage value Unm) are negative voltages:

$$(Un1-U5)<(Un2-U5)< \ldots <(Un((M+1)/2)-U5)>=0,$$

$$(Unm-U5)< \ldots <(Un((M+1)/2+1)-U5)<(Un((M+1)/2)-U5)<=0,$$

$$(Un1-U4)<(Un2-U4)< \ldots <(Un((M+1)/2)-U4)<=0,$$
and $$(Unm-U4)< \ldots <(Un((M+1)/2+1)-U4)<(Un((M+1)/2)-U4)<=0 \quad (13)$$

where Uth is a threshold voltage of the liquid crystal layer.

Figure 15:
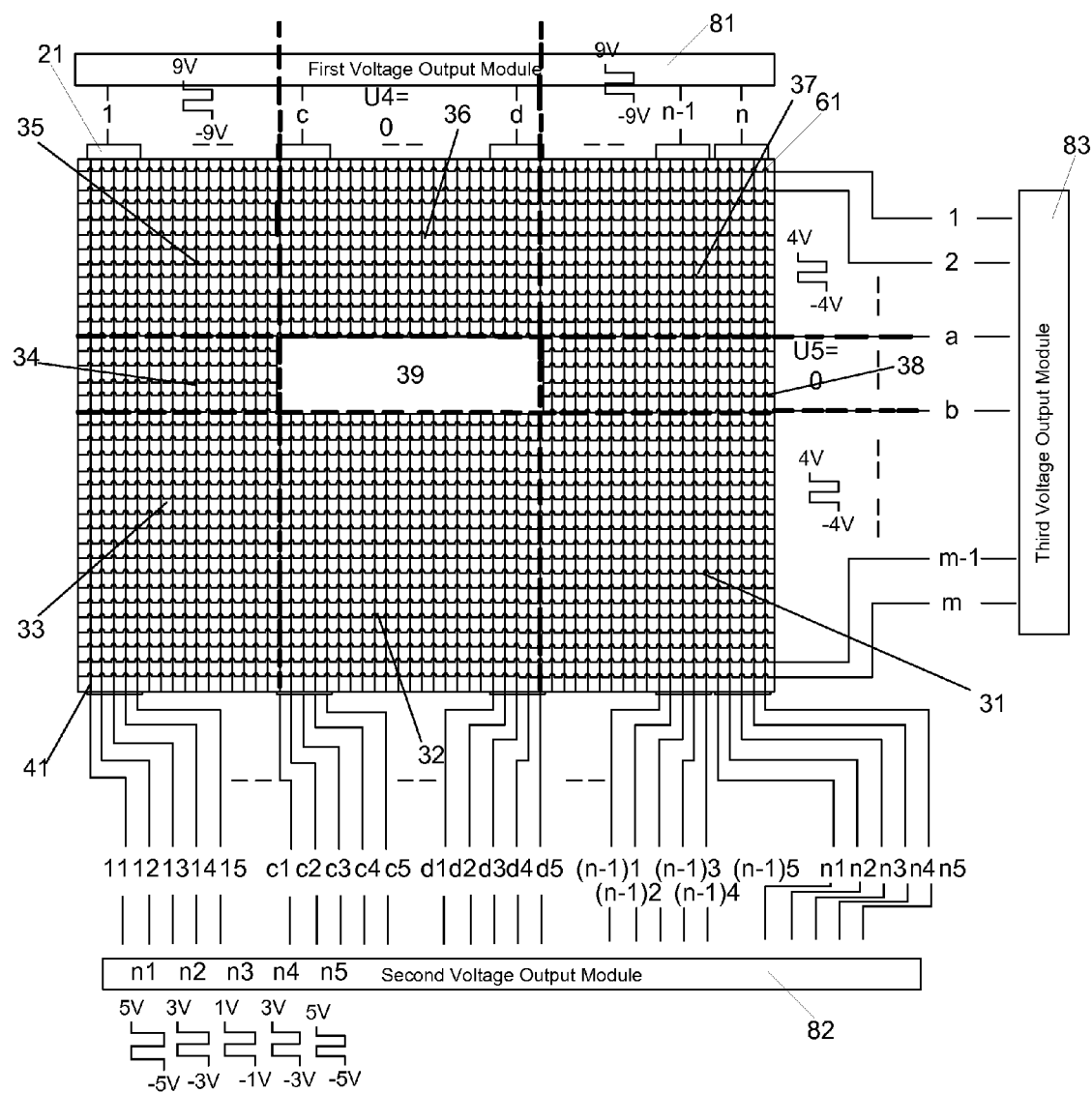
FIG. 15 illustrates an implementation of an exemplary 2D/3D display device in a 2D/3D mode consistent with the disclosed embodiments.

FIG. 15 illustrates a structure diagram of an exemplary circuit when implementing a 2D/3D point-by-point display mode using the 2D/3D display device shown in FIG. 6 consistent with the disclosed embodiments. That is, the image display adjustment signals received by the image processing module 200 include both the 3D display area position information and the 2D image display area position information.

As shown in FIG. 15, region 39 corresponds to the 3D display area, and other regions 31-38 correspond to the 2D image display area, respectively. It should be noted that the display position, size and shape of the 3D display area are determined by the 3D display area information outputted by the control port 100. The 3D display area may be any position in the screen. The 3D display region 39 in FIG. 15 is only an example for illustration purposes. The first electrodes 21 in the 3D display region 39 are flagged correspondingly as c to d. The second electrodes 41 in the 3D display region 39 are formed correspondingly as lens unit c and lens unit d. Each lens unit includes five number of electrodes 41, and the third electrodes 61 in the 3D display region 39 are arranged correspondingly as a to b.

The driving method for forming the display image shown in FIG. 15 includes the followings.

No matter which position the 3D display region 39 locates in the display screen, when a 3D image output signal (including the 3D display area position information, the 3D display contents and the voltage offset of image adjustment) exists in image signals of the image processing module 200 received by the second voltage output module 82, according to the full-screen 3D display mode, the driving voltages are applied on the second electrode section 40. That is, the voltage output module 82 applies the driving voltages on the second electrodes 41 of the full-screen by groups. Using the embodiment shown in FIG. 15 as an example, when the driving voltages applied on the 5 second electrodes 41 in one lens unit are respectively Un1, Un2, Un3, Un4, and Un5, various driving voltages applied on the second electrodes 41 are different and satisfy the above formulas (1)-(8).

Based on the predetermined mode for the full-screen 3D display, the driving voltages applied on all third electrodes 61 in the 3D display region 39 are a fixed voltage value U5 and the driving voltages applied on all first electrodes 21 in the 3D display region 39 are also a fixed voltage value U4. From the above, voltage relationships between the voltage value U5 applied on all third electrodes 61 and various voltages applied on the second electrodes 41 in the 3D display region 39, as well as voltage relationships between the voltage value U4 applied on all first electrodes 21 and various voltages applied on the second electrodes 41 in the 3D display region 39 also satisfy the above formulas (1)-(8), such that the 3D image can be displayed in the 3D display region 39.

In addition, for the 2D display regions 31 to 38, because the inputs of the first electrodes 21 and the third electrodes 61 in 2D display regions 31, 33, 35 and 37 are not affected by the 3D display region 39, a 2D display mode can be implemented by adjusting the driving voltages on the first electrodes 21 and the third electrodes 61 in the above four display regions. Thus, the display state for display regions 31, 33, 35, and 37 is the 2D display mode.

Specifically, the first voltage output module 81 inputs driving voltage U4' to the first electrodes 21 in display regions 31, 33, 35 and 37, and the third voltage output module 83 inputs driving voltage U5' to the third electrodes 61 in display regions 31, 33, 35 and 37. The driving voltages satisfy the following conditions: |U4'−Un1|>=Us, |U4'−Un5|>=Us and |U4'−U5'|>=Us, where Us is a saturation voltage of the liquid crystal layer 50.

From the above, the voltage distributed with gradient voltages applied on the second electrodes 41 is destroyed by the driving voltages applied on the first electrodes 21 in the 2D display regions 31, 33, 35 and 37. Therefore, a 2D image display mode is realized. When the 2D image display mode is realized, the state of the liquid crystal molecules is shown in FIG. 8.

For the 2D display regions 34 and 38, because another part of the third electrodes 61 in the 3D display region 39 is in the 2D display regions 34 and 38, the 2D display regions 34 and 38 are affected by controlling the driving voltages applied on the third electrodes 61 in the 3D display region 39. Therefore, the voltage relationship between the second electrodes 41 and the third electrodes 61 in the 2D display regions 34 and 38 is the same as the voltage relationship between the second electrodes 41 and the third electrodes 61 in the 3D display region 39. The 2D display mode can be implemented by adjusting the driving voltages on the first electrodes 21. When the inputted driving voltages on the first electrodes 21 are U4', the driving voltages on the first electrodes 21 may be controlled to satisfy |U4'−U5|>Us, such that the state of the liquid crystal molecules in the liquid crystal layer 50 corresponding to the 2D display regions 34 and 38 is the 2D display mode shown in FIG. 8.

For the 2D display regions 32 and 36, because another part of the first electrodes 21 in the 3D display region 39 is in the 2D display regions 32 and 36, the voltage relationship between the first electrodes 21 and the second electrodes 41 in the 2D display regions 34 and 38 is the same as the voltage relationship between the first electrodes 21 and the second electrodes 41 in the 3D display region 39. The 2D display mode can be implemented by adjusting the driving voltages on the third electrodes 61. When the inputted driving voltages on the third electrodes 61 is U5', the driving voltages on the third electrodes 61 may be controlled to satisfy |Un1−U5'|<=Uth and |Un5−U5'|<=Uth. Therefore, the gradient voltage cannot be formed in the 2D display regions 32 and 36, and the voltage difference is less than the driving voltages of the liquid crystal molecules. Thus, the state of the liquid crystal molecules in the liquid crystal layer 50 corresponding to the 2D display regions 32 and 36 is the 2D display mode shown in FIG. 6.

For example, when the display device is in a full-screen 3D mode, as indicated in FIG. 15, for the second electrode section 40, the various driving voltages for the five number of electrodes 41 in one liquid crystal lens unit may be configured as: Un1=Un5>Uth, Un2=Un4, and |Un1|>|Un2|>|Un3|, where Un1=Un5 being a periodic square wave voltage from −5V to +5V; Un2=Un4 being a periodic square wave voltage from −3V to +3V; and Un3 is a periodic square wave voltage from −1V to +1V. For 3D display region 39, U4 applied on the first electrodes 21 is 0V, and U5 applied on the third electrodes 61 is 0V. For the 2D display regions 31, 33, 35 and 37, U4' applied on the first electrodes 21 is a periodic square wave voltage from −9V to +9V, and U5' applied on the third electrodes 61 is a periodic square wave voltage from −4V to +4V. For the 2D display regions 34 and 38, U4' applied on the first electrodes 21 is a periodic square wave voltage from −9V to +9V, and U5 applied on the third electrodes 61 is 0V. For the 2D display regions 32 and 36, U4 applied on the first electrodes 21 is 0V, and U5' applied on the third electrodes 61 is a periodic square wave voltage from −4V to +4V.

Figure 16:
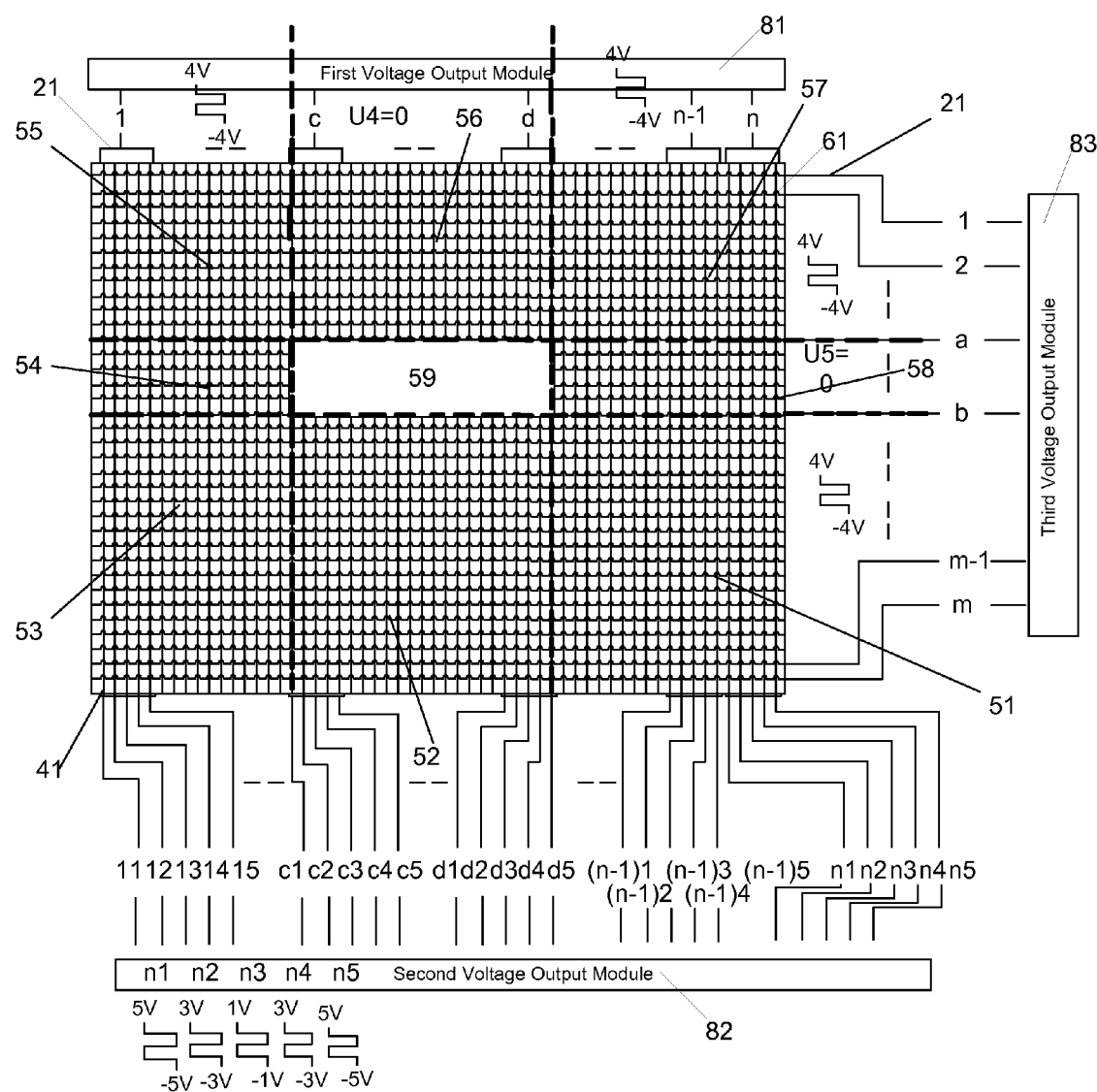
FIG. 16 illustrates an implementation of an exemplary 2D/3D display device in a 2D/3D mode consistent with the disclosed embodiments.

Based on the above driving method, the liquid crystal molecules in the liquid crystal layer 50 form the arrangement structure shown in FIG. 10, but the control mode is not limited to the above method. FIG. 16 illustrates a structure diagram of an exemplary circuit of a second driving method when implementing a 2D/3D point-by-point display mode using the 2D/3D display device shown in FIG. 6 consistent with the disclosed embodiments.

As shown in FIG. 16, in the second driving method, display region 59 corresponds to a 3D display area, and display regions 51-58 correspond to 2D image display areas, respectively. The first electrodes 21 in the 3D display region 59 are flagged correspondingly as c to d. The second electrodes 41 in the 3D display region 59 are flagged correspondingly as c1, c2, c3, c4, c5, d1, d2, d3, d4, and d5. Each lens unit includes five electrodes 41, where c1, c2, c3, c4, and c5 are in one group, and d1, d2, d3, d4, and d5 are in the other group. The third electrodes 61 in the 3D display region 59 are flagged correspondingly as a to b.

As used herein, according to the full-screen 3D display mode, the mode for applying the driving voltages on the second electrodes 41 is the same as the mode shown in FIG. 15. That is, the voltage output module 82 applies the driving voltages on the second electrodes 41 in a full-screen by groups, forming multiple lens units. The various driving voltages applied on the second electrodes 41 in each lens unit satisfy the above formulas (1)-(8).

In addition, the mode for applying the driving voltages on display regions 52 and 56 are the same as the mode for applying the driving voltages on display regions 32 and 36 shown in FIG. 15, which is not repeated herein.

In addition, for the 2D display regions 51, 53, 55 and 57, because the inputs for the first electrodes 21 and the third electrodes 61 are not affected by the 3D display region 39, a 2D display mode can be implemented by adjusting the driving voltages on the first electrodes 21 and the third electrodes 61 in the above four display regions.

Specifically, the first voltage output module 81 outputs the driving voltage U4" to the first electrodes 21 in display regions 51, 53, 55 and 57, and the third voltage output module 83 outputs the driving voltage U5" to the third electrodes 61 in display regions 51, 53, 55 and 57. The driving voltages satisfy the following conditions: |Un1−U4"|<=Uth, |Un5−U4"|<=Uth and |U4"−U5"|<=Uth, where Uth is a threshold voltage of the liquid crystal layer 50.

From the above, the voltages of the two sides of the liquid crystal layer 50 in the 2D display regions 51, 53, 55 and 57 are less than or equal to Uth. Therefore, the state of the liquid crystal molecules shown in FIG. 6 is formed. Thus, a 2D image display mode may be realized.

For the 2D display regions 44 and 48, the voltage relationship between the second electrodes 41 and the third electrodes 61 in the 2D display regions 44 and 48 is the same as the voltage relationship between the second electrodes 41 and the third electrodes 61 in the 3D display region 59. The 2D display mode can be implemented by adjusting the driving voltages on the first electrodes 21. When the inputted driving voltages on the first electrodes 21 is U4", the driving voltages on the first electrodes 21 may be controlled to satisfy: |Un1−U4"|<=Uth, |Un5−U4"|<=Uth and |U4"−U5|>Uth, such that the liquid crystal molecules in the liquid crystal layer 50 corresponding to the 2D display regions 44 and 48 is deflected, but no lens effect is achieved, implementing the 2D display mode.

For example, when the display device is in a full-screen 3D mode, as indicated in FIG. 16, for the second electrode section 40, the various driving voltages for the five number of electrodes 41 in one liquid crystal lens unit may be configured as: Un1=Un5>Uth, Un2=Un4, and |Un1|>|Un2|>|Un3|, where Un1=Un5 being a periodic square wave voltage from −5V to +5V; Un2=Un4 being a periodic square wave voltage from −3V to +3V; and Un3 is a periodic square wave voltage from −1V to +1V. For 3D display region 59, the driving voltage U4 applied on the first electrodes 21 is 0V, and the driving voltage U5 applied on the third electrodes 61 is 0V.

For the 2D display regions 51, 53, 55 and 57, the driving voltage U4" applied on the first electrodes 21 is a periodic square wave voltage from −4V to +4V, and U5" applied on the third electrodes 61 is a periodic square wave voltage from −4V to +4V. For the 2D display regions 54 and 58, the driving voltage U4" applied on the first electrodes 21 is a periodic square wave voltage from −4V to +4V, and the driving voltage U5 applied on the third electrodes 61 is 0. For the 2D display regions 52 and 56, U4 applied on the first electrodes 21 is 0, and U5" applied on the third electrodes 61 is a periodic square wave voltage from −4V to +4V.

Based on the above driving method, the liquid crystal molecules in the liquid crystal layer 50 form the arrangement structure shown in FIG. 11.

The driving method used in the 2D/3D display device shown in FIG. 6 is described in details. The driving method can also be applied to the 2D/3D display device shown in FIG. 7. Because the first electrode section 20 is closer to the liquid crystal layer 50 than the second electrode section 40 in FIG. 7, to avoid that the output of the driving voltages on the first electrode section 20 in the 3D display area affects the driving voltages on the second electrode section 40, the first electrode section 20 corresponding to the 3D display area needs to be set to a power off state. The driving method on the first electrode section 20, the second electrode section 40, and the third electrode section 60 in other areas is the same as the driving method on the first electrode section 20, the second electrode section 40, and the third electrode section 60 in FIG. 6. The details are not repeated herein.

In the other hand, from the above, the driving method when each lens unit in the second electrode section 40 includes five (5) second electrodes is described in details. It should be noted that the number of the second electrodes 41 included in one liquid crystal lens unit is not limited to 5, and the number of the second electrodes 41 included in one liquid crystal lens unit is not limited to an odd number. For example, the number of the second electrodes 41 included in one liquid crystal lens unit may also be 3, 4, 7, 8, 9, etc. The number of the second electrodes 41 included in one liquid crystal lens unit can be determined according to specific design requirement.

When M number of the second electrodes 41 are included in one liquid crystal lens unit and M is an even number, the driving voltages (from the first driving voltage value Un1 to the Mth driving voltage value Unm) are respectively provided for the corresponding second electrodes (from the first second electrode unit to the Mth second electrode unit), forming the effect of the liquid crystal lens distributed in the gradient voltages and realizing the 3D display. The driving voltages (from the first driving voltage value Un1 to the Mth driving voltage value Unm) are periodic square wave voltages and satisfy the following conditions:

$$|Un1|>|Un2|> \ldots >|Un(M/2)|,$$
$$\text{and } |Unm|> \ldots >|Un((M/2+2)|>|Un(M/2+1)|,$$

where |Un(M/2)| and |Un(M/2+1)| are equal or unequal; and

|Un1−U5|>Uth, |Unm−U5|>Uth; |Un1−U4|>Uth, |Unm−U4|>Uth, |U4−U5|<Uth, where Uth is a threshold voltage of the liquid crystal layer.

When the first driving voltage value Un1 to the Mth driving voltage value Unm are positive voltages, (Un1−U5)>(Un2−U5)> . . . >(Un(M/2)−U5)>=0, and (Unm−U5)> . . . >(Un(M/2+2)−U5)>(Un(M/2+1)−U5)>=0, and (Un1−U4)>(Un2−U4)> . . . >(Un(M/2)−U4)>=0, and (Unm−U4)> . . . >(Un(M/2+2)−U4)>(Un(M/2+1)−U4)>=0.

When the first driving voltage value Un1 to the Mth driving voltage value Unm are negative voltages, (Un1−U5)<(Un2−U5)< . . . <(Un(M/2)−U5)<=0, (Unm−U5)< . . . <(Un(M/2+2)−U5)<(Un(M/2+1)−U5)<=0, (Un1−U4)<(Un2−U4)< . . . <(Un(M/2)−U4)<=0, (Unm−U4)< . . . <(Un(M/2+2)−U4)<(Un(M/2+1)−U4)<=0.

By using the disclosed methods and devices, compared to the existing technologies, a control electrode section (e.g., the first electrode section shown in FIG. 6) is added such that when 2D display contents and 3D display contents displayed on the same screen is switched, only the driving voltages on the first electrode section and the third electrode section with fewer electrodes need to be changed. Therefore, circuit structure is simple, and it is easy to implement the control mode.

The disclosed liquid crystal lens, 2D/3D display device and driving method can be applied to a 2D/3D display system. The 2D/3D display device can switch 2D/3D display and simultaneously display 2D display images and 3D display images on a same screen.

It is understood that the various voltage values used in this disclosure are for illustrative purposes. For example, an arithmetic series of voltages may be provided. Any appropriate voltages values may be used.

The above described embodiments are only for illustrative purposes. It should be noted that those skilled in the art, without departing from the principles of the present disclosure, may make certain improvements and modifications, and these improvements and modifications should also be considered within the scope of the disclosure.

Other applications, advantages, alternations, modifications, or equivalents to the disclosed embodiments are obvious to those skilled in the art.

What is claimed is:

1. A driving method for 2D/3D display applied to a 2D/3D display system including a liquid crystal layer, a first electrode section including a plurality of first electrodes and a second electrode section including a plurality of second electrodes on a first side of the liquid crystal layer, a third electrode section including a plurality of third electrodes arranged on a second side of the liquid crystal layer, wherein one liquid crystal lens unit includes more than two second electrodes, and one first electrode corresponds to at least one liquid crystal lens unit, comprising:

receiving, by voltage output modules, image display adjustment signals, wherein the image display adjustment signals includes at least one of 2D display area position information and 3D display area position information; and based on the received image display adjustment signals, providing, by the voltage output modules, one or more driving voltages for the first electrode section, the second electrode section and the third electrode section, wherein in the display area:

when liquid crystal molecules in a 3D display area corresponding to the 3D display area position information form multiple liquid crystal lens units with refractive indexes of the liquid crystal molecules distributed in a gradient, 3D content is displayed in the 3D display area; and when the refractive indexes of the liquid crystal molecules in a 2D display area corresponding to the 2D display area position information are not distributed in a gradient, 2D content is displayed in the 2D display area, wherein:

the second electrode section is arranged to face the first electrode section;

the second electrode section is distributed in an array manner, wherein one liquid crystal lens unit includes M number of the second electrodes, and M is an integer greater than 2;

the first electrode section is distributed in an array manner;

wherein the first electrodes and the second electrodes extend along a same direction; and each of the third electrodes is inter-disposed with multiple first electrodes, wherein when the image display adjustment signals include the 3D display area position information:

applying a fourth voltage U4 on each of the first electrodes in the 3D display area;

applying a fifth voltage U5 on each of the third electrodes in the 3D display area; and applying the driving voltages on the second electrodes corresponding to each liquid crystal lens unit in the 3D display area in a predetermined mode, wherein the driving voltages applied on each of the second electrodes corresponding to the liquid crystal lens unit are different in the 3D display area, wherein applying the driving voltages on the second electrodes corresponding to each liquid crystal lens unit in the 3D display area in a predetermined mode, wherein the driving voltages applied on each of the second electrodes corresponding to the liquid crystal lens unit are different in the 3D display area further includes:

applying the driving voltages that are from the first driving voltage value Un1 to the Mth driving voltage value Unm on the corresponding second electrodes that are from the first second electrode unit to the Mth second electrode unit, respectively, wherein:

when M is an odd number, the driving voltages that are from the first driving voltage value Un1 to the Mth driving voltage value Unm are periodic square wave voltages and satisfy the following conditions:

|Un1|>|Un2|> . . . >|Un((M+1)/2)|,
 and |Unm|> . . . >|Un((M+1)/2+1)|>
 |Un((M+1)/2)|;

|Un1−U5|>Uth, and |Unm−U5|>Uth; and

|Un1−U4|>Uth, |Unm−U4|>Uth, and |U4−U5|<Uth,
 wherein Uth is a threshold voltage of the liquid crystal layer;

When the driving voltages that are from the first driving voltage value Un1 to the Mth driving voltage value Unm are positive voltages, (Un1−U5)>(Un2−U5)> . . . >(Un((M+1)/2)−U5)>=0, (Unm−U5)> . . . >(Un((M+1)/2+1)−U5)>(Un((M+1)/2)−U5)>=0, (Un1−U4)>(Un2−U4)> . . . >(Un((M+1)/2)−U4)>=0, and (Unm−U4)> . . . >(Un((M+1)/2+1)−U4)>(Un((M+1)/2)−U4)>=0; and When the driving voltages that are from the first driving voltage value Un1 to the Mth driving voltage value Unm are negative voltages, (Un1−U5)<(Un2−U5)< . . . <(Un((M+1)/2)−U5)<=0, (Unm−U5)< . . . <(Un((M+1)/2+1)−U5)<(Un((M+1)/2)−U5)<=0, and (Un1−U4)<(Un2−U4)< . . . <(Un((M+1)/2)−U4)<=0, (Unm−U4)< . . . <(Un((M+1)/2+1)−U4)<(Un((M+1)/2)−U4)<=0, wherein Un1 to Unm is symmetrical distribution about Un((M+1)/2); and when M is an even number, the driving voltages that are from the first driving voltage value Un1 to the Mth driving voltage value Unm are periodic square wave voltages and satisfy the following conditions:

|Un1|>|Un2|> . . . >|Un(M/2)|,
 and |Unm|> . . . >|Un((M/2+2)|>|Un(M/2+1)|;
 and

|Un1−U5|>Uth, |Unm−U5|>Uth; |Un1−U4|>Uth,
 |Unm−U4|>Uth, |U4−U5|<Uth, wherein Uth is
 a threshold voltage of the liquid crystal layer;

When the first driving voltage value Un1 to the Mth driving voltage value Unm are positive voltages, (Un1−U5)>(Un2−U5)> . . . >(Un(M/2)−U5)>=0, and (Unm−U5)> . . . >(Un(M/2+2)−U5)>(Un(M/2+1)−U5)>=0, and (Un1−U4)>(Un2−U4)> . . . >(Un(M/2)−U4)>=0, and (Unm−U4)> . . . >(Un(M/2+2)−U4)>(Un(M/2+1)−U4)>=0; and When the first driving voltage value Un1 to the Mth driving voltage value Unm are negative voltages, (Un1−U5)<(Un2−U5)< . . . <(Un(M/2)−U5)<=0, (Unm−U5)< . . . <(Un(M/2+2)−U5)<(Un(M/2+1)−U5)<=0, (Un1−U4)<(Un2−U4)< . . . <(Un(M/2)−U4)<=0, and (Unm−U4)< . . . <(Un(M/2+2)−U4)<(Un(M/2+1)−U4)<=0, wherein |Un(M/2)| is equal to or unequal to |Un(M/2+1)|.

2. The driving method according to claim, wherein:
the liquid crystal molecules in the 2D display area relative to the first electrodes, the second electrodes, and the third electrodes are one of a vertical state, a horizontal state, a state having a deflection angle.

3. The driving method according to claim 1, when the image display adjustment signals do not include the 3D display area position information in a full-screen 2D mode, further including:
applying a first voltage U1 on each of the first electrodes;
applying a second voltage U2 on each of the second electrodes; and
applying a third voltage U3 on each of the third electrodes, wherein:
 a first voltage difference exists between the first voltage U1 and the third voltage U3;
 a second voltage difference exists between the second voltage U2 and the third voltage U3;
 both the first voltage difference and the second voltage difference are less than or equal to a threshold voltage Uth of the liquid crystal layer; or
 both the first voltage difference and the second voltage difference are greater than or equal to a saturation voltage Us of the liquid crystal layer.

4. The driving method according to claim 3, wherein both the first voltage difference and the second voltage difference are less than or equal to a threshold voltage Uth of the liquid crystal layer further includes:
the first voltage U1, the second voltage U2 and the third voltage U3 are 0V; or
no voltage is applied on the first electrodes, the second electrodes and the third electrodes.

5. The driving method according to claim 1, wherein:
each liquid crystal lens unit includes the 5 number of the second electrodes; and
Un1, Un2, Un3, Un4, and Un5 are applied respectively on the 5 number of the second electrodes in the liquid crystal lens unit, wherein:
 Un1=Un5 being a periodic square wave voltage from −5V to +5V;
 Un2=Un4 being a periodic square wave voltage from −3V to +3V; and
 Un3 is a periodic square wave voltage from −1V to +1V.

6. The driving method according to claim 1, wherein when the image display adjustment signals further include the 2D image display area position information, one of the following conditions is satisfied:
condition (1): the absolute values of differences between the driving voltage values on the first electrodes and the driving voltage values on the second electrodes are greater than or equal to Us, and the absolute values of differences between the driving voltage values on the first electrodes and the driving voltage values on the third electrodes are greater than or equal to Us in the 2D image display area, wherein Us is a saturation voltage of the liquid crystal layer;
condition (2): the absolute values of differences between the driving voltage values on the second electrodes and the driving voltage values on the third electrodes are less than or equal to Uth in the 2D image display area, wherein Uth is a threshold voltage of the liquid crystal layer;
condition (3): the absolute values of differences between the driving voltage values on the second electrodes and the driving voltage values on the first electrodes are less than or equal to Uth, and the absolute values of the differences between the driving voltage values on the first electrodes and the driving voltage values on the third electrodes are less than or equal to Uth in the 2D image display area, wherein Uth is a threshold voltage of the liquid crystal layer; and condition (4): the absolute values of the differences between the driving voltage values on the second electrodes and the driving voltage values on the first electrodes are less than or equal to Uth, and the absolute values of the differences between the driving voltage values on the first electrodes and the driving voltage values on the third electrodes are greater than Uth in the 2D image display area, wherein Uth is a threshold voltage of the liquid crystal layer.

7. The driving method according to claim 1, wherein:

both the fourth voltage U4 and the fifth voltage U5 are 0V; or no voltage is applied on the first electrodes and the fifth voltage U5 is 0V.

* * * * *